United States Patent
Marpaung et al.

(10) Patent No.: US 9,673,908 B2
(45) Date of Patent: Jun. 6, 2017

(54) DEVICE AND A METHOD FOR GENERATING AN ELECTRICAL SIGNAL WITH A SUPPRESSED FREQUENCY BAND

(71) Applicant: The University of Sydney, Sydney (AU)

(72) Inventors: David Marpaung, Sydney (AU); Blair Morrison, Sydney (AU); Ravi Pant, Sydney (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 14/899,951

(22) PCT Filed: Jun. 18, 2014

(86) PCT No.: PCT/AU2014/050078
§ 371 (c)(1),
(2) Date: Dec. 18, 2015

(87) PCT Pub. No.: WO2014/201519
PCT Pub. Date: Dec. 24, 2014

(65) Prior Publication Data
US 2016/0142148 A1    May 19, 2016

(30) Foreign Application Priority Data

Jun. 19, 2013  (AU) ................................ 2013902213
Nov. 21, 2013  (AU) ................................ 2013904498

(51) Int. Cl.
*H04B 10/00* (2013.01)
*H04B 10/516* (2013.01)
(Continued)

(52) U.S. Cl.
CPC ....... *H04B 10/5165* (2013.01); *H01S 3/0078* (2013.01); *H01S 3/0085* (2013.01);
(Continued)

(58) Field of Classification Search
USPC ................................................. 398/182–201
See application file for complete search history.

(56) References Cited

U.S. PATENT DOCUMENTS 5,781,327 A * 7/1998 Brock ................... G02F 1/0327
                                                       359/245
6,512,619 B1 * 1/2003 Fuse .................... H04B 10/548
                                                       359/237
(Continued)

FOREIGN PATENT DOCUMENTS

WO    WO-2014/201519         12/2014

OTHER PUBLICATIONS

"International Application No. PCT/AU2014/050078, International Search Report mailed Jun. 18, 2014", (Jun. 18, 2014), 5 pgs.
(Continued)

*Primary Examiner* — Agustin Bello
(74) *Attorney, Agent, or Firm* — Schwegman Lundberg & Woessner, P.A.

(57) ABSTRACT

Disclosed herein is a notch filter and a method for generating an electrical signal with a suppressed frequency band. The filter generates an optical signal by modulating a modulation optical wave with an electrical signal to generate first and second sidebands. The first sideband or the second sideband has less power than the other. The filter then modifies the optical signal by equalizing the power of light within the first side band at a selected frequency band and light within the second side band at the selected frequency band. The filter then produces an antiphase relationship between the light within the first side band at the selected frequency band and the light within the second side band at the selected frequency band. The filter then detects the modified optical (Continued)

signal to generate a copy of the electrical signal with suppressed frequency components within the selected frequency band.

25 Claims, 16 Drawing Sheets

(51) Int. Cl.
*H01S 3/00* (2006.01)
*H04B 10/079* (2013.01)
*H04B 10/564* (2013.01)
*H01S 3/067* (2006.01)
*H01S 3/30* (2006.01)

(52) U.S. Cl.
CPC ..... *H04B 10/07955* (2013.01); *H04B 10/564* (2013.01); *H01S 3/06754* (2013.01); *H01S 3/302* (2013.01); *H04B 2210/006* (2013.01)

(56) References Cited

U.S. PATENT DOCUMENTS

| | | | | |
|---|---|---|---|---|
| 6,525,857 | B1 * | 2/2003 | Way | H04B 10/50 398/132 |
| 6,801,968 | B2 | 10/2004 | Hunter | |
| 7,340,183 | B2 * | 3/2008 | Price | H04B 10/2575 398/187 |
| 7,515,833 | B2 * | 4/2009 | Way | G02F 1/0356 359/245 |
| 7,577,367 | B2 * | 8/2009 | Way | H04B 10/2575 359/237 |
| 7,672,598 | B1 * | 3/2010 | Campillo | H04B 10/50 398/183 |
| 8,014,676 | B2 * | 9/2011 | Chen | H04B 10/00 398/183 |
| 8,103,175 | B1 * | 1/2012 | Kowalczyk | H04B 10/25759 359/334 |
| 8,538,270 | B2 * | 9/2013 | Seidel | G02F 2/002 372/21 |
| 8,638,489 | B2 * | 1/2014 | Duthel | H04B 10/506 359/237 |
| 9,163,958 | B2 * | 10/2015 | Zadok | H04B 10/071 |
| 9,294,216 | B2 * | 3/2016 | Lowery | H04B 10/548 |
| 2002/0159672 | A1 * | 10/2002 | Fells | G02B 6/2932 385/13 |
| 2003/0215173 | A1 * | 11/2003 | Hakimi | G02B 6/2706 385/15 |
| 2004/0208622 | A1 * | 10/2004 | Grosz | H04B 10/5162 398/160 |
| 2006/0140643 | A1 * | 6/2006 | Way | H04B 10/50 398/183 |
| 2007/0166054 | A1 * | 7/2007 | Yu | H04B 10/2575 398/188 |
| 2009/0067843 | A1 * | 3/2009 | Way | H04B 10/506 398/79 |
| 2014/0083197 | A1 * | 3/2014 | Zadok | H04B 10/071 73/800 |
| 2014/0294393 | A1 * | 10/2014 | Lowery | H04B 10/548 398/76 |
| 2014/0363159 | A1 * | 12/2014 | Chien | H04B 10/506 398/43 |
| 2015/0078762 | A1 * | 3/2015 | Ishihara | H04B 10/07951 398/193 |
| 2015/0078765 | A1 * | 3/2015 | Ishihara | H04B 10/07951 398/208 |
| 2015/0333827 | A1 * | 11/2015 | Okabe | H04B 10/5057 398/38 |
| 2016/0142148 | A1 * | 5/2016 | Marpaung | H04B 10/07955 398/38 |

OTHER PUBLICATIONS

"International Application No. PCT/AU2014/050078, Written Opinion of the International Searching Authority mailed Jul. 28, 2014", (Jul. 28, 2014), 3 pgs.

* cited by examiner ary, the filter may supress noise within the frequency

DEVICE AND A METHOD FOR GENERATING AN ELECTRICAL SIGNAL WITH A SUPPRESSED FREQUENCY BAND

CROSS-REFERENCE TO RELATED APPLICATIONS

This application is a U.S. national stage application filed under 35 U.S.C. §371 from International Application Serial No. PCT/AU2014/050078, which was filed 18 Jun. 2014, and published as WO2014/201519 on 24 Dec. 2014, and which claims priority from Australian Provisional Patent Application No 2013902213 filed on 19 Jun. 2013 and Australian Provisional Patent Application No. 2013904498 filed on 21 Nov. 2013, which applications and publication are incorporated by reference as if reproduced herein and made a part hereof in their entirety, and the benefit of priority of each of which is claimed herein.

TECHNICAL FIELD

The disclosure herein generally relates to a device and a method for generating an electrical signal with a suppressed frequency band and a computer-implemented method, software and a computer system for controlling a filter device.

BACKGROUND

An electrical signal processing system may have a filter that removes a frequency band from the electrical signal. For example, the filter may supress noise within the frequency band. An example of such a filter is a microwave notch filter.

Ideally, the filter does not disturb the desired frequency components of the signal. Other desirable characteristics include a narrow attenuation response, high peak attenuation, and highly tuneable centre frequency. Designing a filter using prior art technology having all of the desirable characteristics may be difficult or impossible. One example of a prior art filter is a state-of-the-art microwave notch filter having an absorptive band-stop design, a 3 dB rejection bandwidth of 9.7 MHz, a 10 dB rejection bandwidth of 3 MHz, 30 dB peak attenuation, and a centre frequency of around 3.6 GHz. The centre frequency, however, may only by tuned over a 400 MHz range.

SUMMARY

Disclosed herein is a method. The method comprises the step of generating an optical signal by modulating a modulation optical wave with an electrical signal to generate a first sideband to the modulation optical wave and a second sideband to the modulation optical wave, one of the first sideband and the second sideband having less power than the other. The method comprises the step of modifying the optical signal by equalising the power of light within the first side band corresponding to a selected frequency band and light within the second side band corresponding to the selected frequency band, and producing an antiphase relationship between the light within the first side band corresponding to the selected frequency band and the light within the second side band corresponding to the selected frequency band. The method comprises the step of detecting the modified optical signal with an optical-to-electrical converter to generate a copy of the electrical signal with suppressed frequency components within the selected frequency band.

The selected frequency band is generally a selected frequency band of the electrical signal.

Embodiments of the device may be more tuneable, have a narrower rejection bandwidth, and greater peak attenuation than a prior art filter.

In an embodiment, the step of generating the optical signal comprises modulating the modulation optical wave with a Mach-Zehnder modulator system. The Mach-Zehnder modulator system may comprise a plurality of component modulators in communication with an optical output of the Mach-Zehnder modulator system and the method comprises independently biasing the plurality of component modulators. The electrical signal may be split into a plurality of split electrical signals. At least some of each of the plurality of component modulators may be driven with a respective one of the plurality of split electrical signals. One of the plurality of split electrical signals may be out of phase with another one the plurality of split electrical signals.

In an embodiment, modifying the optical signal comprises the step of applying an optical resonance to the optical signal to: equalise the power of the light in the first side band corresponding to the selected frequency band and the power of the light in the second side band corresponding to the selected frequency band; and produce the antiphase relationship. The optical resonance may comprise a stimulated nonlinear optical resonance that one of increases and decreases the power of one of the light within the first side band corresponding to the selected frequency band and the light within the second side band corresponding to the selected frequency band. The step of applying the stimulated nonlinear optical resonance to the optical signal may comprise tuning a magnitude of gain of the stimulated nonlinear optical resonance such that the equalisation is achieved within the frequency band. Changing the magnitude of the gain may change the width of the band of supressed frequencies. The stimulated nonlinear optical resonance may be stimulated Brillouin scattering. The stimulated nonlinear optical resonance may be stimulated Raman scattering.

An embodiment comprises the step of changing the average frequency of a stimulating optical wave of the stimulated nonlinear optical resonance such that the stimulated nonlinear optical resonance so modifies the optical signal. Changing the average frequency of the stimulating optical wave may comprise changing a frequency of electricity driving an optical modulator used to generate the stimulating optical wave. The output of the optical modulator used to generate the stimulating optical wave may be filtered to supress optical frequencies other than those of the stimulating optical wave.

In an embodiment, the optical resonance is an atomic optical resonance.

In an embodiment, the optical resonance is a linear optical resonance. Applying the linear optical resonance may comprise passing the optical signal through one of a ring resonator, a Fabry-Perot resonator, a Bragg grating, and a photonic crystal. In the context of this specification, a linear optical resonance structure is a resonating structure that does not use a nonlinear response to light incident thereon. The geometry of the linear optical resonance structure may be circular or generally any suitable geometry—the geometry need not be linear.

Disclosed herein is a device. The device comprises an optical signal generator arranged to modulate a modulation optical wave when received by the optical signal generator with an electrical signal to generate a first sideband to the modulation optical wave and a second sideband to the modulation optical wave, one of the first sideband and the second sideband having less power than the other. The device comprises an optical signal modifier arranged to modify the optical signal by equalising the power of light within the first side band corresponding to a selected frequency band and light within the second side band corresponding to the selected frequency band, and produce an antiphase relationship between the light within the first side band corresponding the selected frequency band and the light within the second side band corresponding to the selected frequency band. The device comprises an optical-to-electrical-converter arranged to receive the modified optical signal to generate a copy of the electrical signal with suppressed frequency components within the selected frequency band.

In an embodiment, the optical signal generator comprises a Mach-Zehnder modulator system arranges to modulate the modulation optical wave. The Mach-Zehnder modulator system may comprise a plurality of component modulators in communication with an optical output of the Mach-Zehnder modulator system. The Mach-Zehnder modulator system may comprise biasing electronics arranged to independently bias the plurality of component modulators.

An embodiment may comprise an electrical signal splitter arranged to split the electrical signal into a plurality of split electrical signals and drive each of the plurality of component modulators with a respective one of the plurality of split electrical signals. The electrical signal splitter may be arranged to cause one of the plurality of split electrical signals to be out of phase with respect to another one of the plurality of split electrical signals. The electrical signal splitter may be arranged to cause one of the plurality of split electrical signals to be in quadrature with respect to another one of the plurality of split electrical signals.

In an embodiment, the optical signal modifier comprises an optical resonance system arranged to receive the optical signal and subsequently to: equalise the power of the light in the first side band corresponding to the selected frequency band and the power of the light in the second side band corresponding to the selected frequency band; and produce the antiphase relationship. The optical resonance system may comprise a stimulated nonlinear optical resonance system that is arranged to one of increase and decrease the power of one of the light within the first side band corresponding to the selected frequency band and light within the second side band corresponding to the selected frequency band. The stimulated nonlinear optical resonance system may be a stimulated Brillouin scattering system. The stimulated nonlinear optical resonance system may be a stimulated Raman scattering system. The stimulated nonlinear optical resonance system may comprise a tuneable stimulating optical wave generator arranged to generate a stimulating optical wave of tuneable frequency. The stimulated nonlinear optical response system may comprise a third order nonlinear optical medium arranged to receive the optical signal and stimulating optical wave when so generated. The tuneable stimulating optical wave generator may comprise an optical modulator. An average frequency of the stimulating optical wave may be changed by changing a frequency of electricity driving the optical modulator.

An embodiment may comprise a filter arranged to filter the stimulating optical wave when so generated to supress optical frequencies other than those of the stimulating optical wave.

In an embodiment, the optical resonance system comprises a plurality of atoms having an optical resonance.

In an embodiment, the optical resonance system comprises a linear optical resonance structure. The linear optical resonance structure may comprise one of a ring resonator, a Fabry-Perot resonator, a Bragg grating, and a photonic crystal.

Disclosed herein is a computer-implemented method for controlling a filter device. The method comprises the steps of:
receiving one or more measured output characteristics of the filter;
determining a difference between the one or more measured output characteristics and one or more desired output characteristics; and
determining based on the difference
one or more modulation parameters controlling a modulation of an modulation optical wave with an electrical signal to generate a first sideband to the modulation optical wave and a second sideband to the modulation optical wave, one of the first sideband and the second sideband having less power than the other, and
one or more modification parameters controlling an equalisation of the power of light within the first side band corresponding to a selected frequency band and light within the second side band corresponding to the selected frequency band, and controlling the production of an antiphase relationship between the light within the first side band corresponding to the selected frequency band and the light within the second side band corresponding to the selected frequency band.

The modulation parameters may comprise one or more of:
three bias voltages to control the power of the first sideband and the second sideband;
a first temperature of a first laser generating the modulation optical wave to control the selected frequency band; and
a first input current of a first laser generating the modulation optical wave to control an attenuation within the selected frequency band.

The modification parameters may comprise one or more of:
a fourth bias voltage of an optical attenuator to control a bandwidth of the selected frequency band;
a second temperature of a second laser generating a stimulating optical wave to control the selected frequency band; and
a second input current of a second laser generating a stimulating optical wave to control an attenuation within the selected frequency band.

The output characteristics may comprise a centre frequency of the selected frequency band, a bandwidth of the selected frequency band and an attenuation within the selected frequency band and determining the one or more modulation parameters and the one or more modification parameters may comprise:
determining a first frequency control parameter of a first laser generating the modulation optical wave and a second frequency control parameter of a second laser generating a stimulating optical wave to adjust the measured centre frequency towards the desired centre frequency;
determining an attenuation control parameter of an optical attenuator to adjust the measured bandwidth towards the adjusted bandwidth; and
determining one or more sideband power control parameters to adjust the measured attenuation towards the desired attenuation.

The determining steps may be performed in the order of:
(1) determining the first frequency control parameter and the second frequency control parameter;
(2) determining the attenuation control parameter; and
(3) determining the one or more sideband power control parameters.

Disclosed herein is software, that is, computer readable instructions stored on computer readable media, that when executed by a computer causes the computer to perform the method for controlling a filter device.

Disclosed herein is a computer system for controlling a filter device. The computer system comprises:
an input port to receive one or more measured output characteristics of the filter; and
a processor to determine a difference between the one or more measured output characteristics and one or more desired output characteristics and to determine based on the difference
one or more modulation parameters controlling a modulation of an modulation optical wave with an electrical signal to generate a first sideband to the modulation optical wave and a second sideband to the modulation optical wave, one of the first sideband and the second sideband having less power than the other, and
one or more modification parameters controlling an equalisation of the power of light within the first side band corresponding to a selected frequency band and light within the second side band corresponding to the selected frequency band, and controlling the production of an antiphase relationship between the light within the first side band corresponding to the selected frequency band and the light within the second side band corresponding to the selected frequency band.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DESCRIPTION OF EMBODIMENTS

Figure 1:
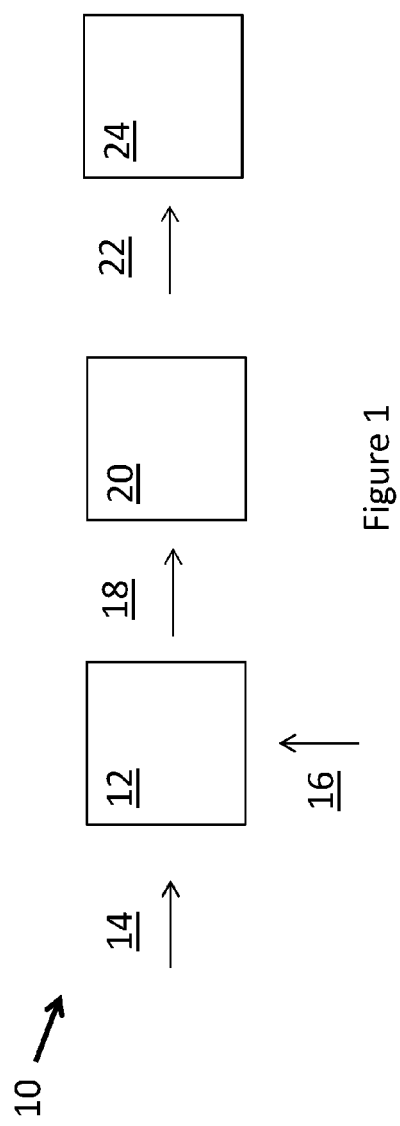
FIG. 1 shows a block diagram of an embodiment of a device.
Figure 2:
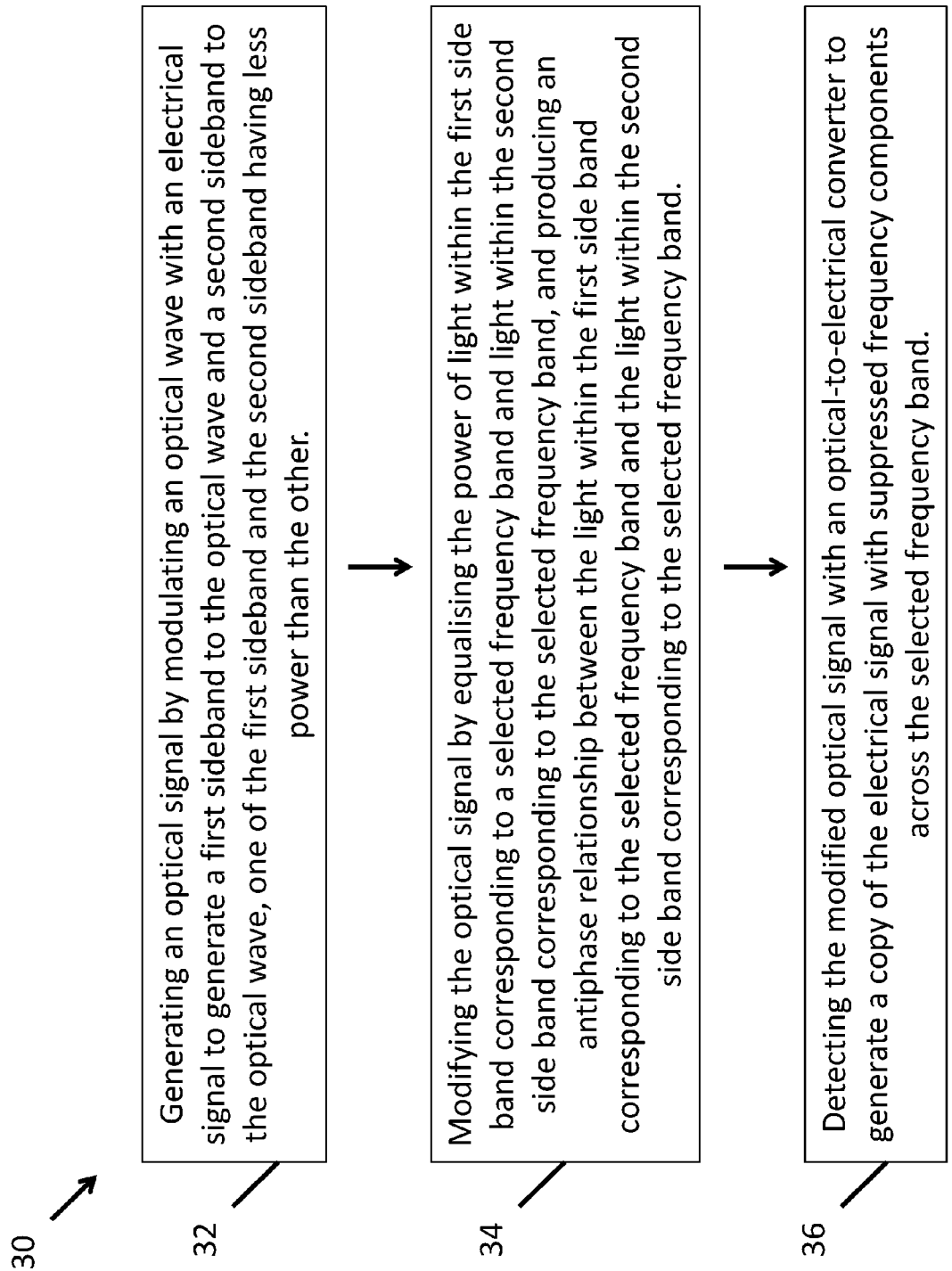
FIG. 2 shows a flow diagram of an embodiment of a method.

FIG. 1 shows a block diagram of an embodiment of a device generally indicated by the numeral 10. The device has an optical signal generator 12. In use, the optical signal generator performs a step 32 of an embodiment of a method represented by the flow diagram 20 in FIG. 2. The optical signal generator 12 is arranged to modulate a modulation optical wave 14 when received by the optical signal generator with an electrical signal 16 to generate an optical output 18 having a first sideband to the modulation optical wave and a second sideband to the modulation optical wave 14. The electrical signal may be a radio frequency electrical signal, an example of which includes but is not limited to a microwave frequency electrical signal. One of the first sideband and the second sideband has less power than the other. The device 10 has an optical signal modifier 20. The optical signal modifier 20, in use, performs another step 34 of the method 30. The optical signal modifier 20 is arranged to modify the optical signal by equalising the power of light within the first side band corresponding to a selected frequency band and light within the second side band corresponding to the selected frequency band, and to produce an antiphase relationship between the light within the first side band corresponding the selected frequency band and the light within the second side band corresponding to the selected frequency band. The selected frequency band is one that it is desired to supress within the electronic signal. In the context of this document, antiphase means out of phase by $\pm\pi$ radians. The device comprises an optical-to-electrical-converter 24 that is arranged to receive the modified optical signal 22. The optical-to-electrical converter 24, in use, performs yet another step 36 of the method 30. The optical-to-electrical converter is arranged to detect the modified optical signal to generate a copy of the electrical signal with suppressed frequency components within the selected frequency band.

The device 10 outputs a copy of the electrical signal with a "notch" in it, which is the same function performed by prior art microwave notch filters. As will be detailed below, however, the device 10 may have better performance than a state-of-the-art microwave notch filter.

Neither the equalisation of powers nor the produced antiphase relationship require perfection. Some imperfection in the equalisation of powers and/or the produced antiphase relationship may produce acceptable suppression of the frequency components within the selected frequency band, depending on the suppression required.

Figure 3:
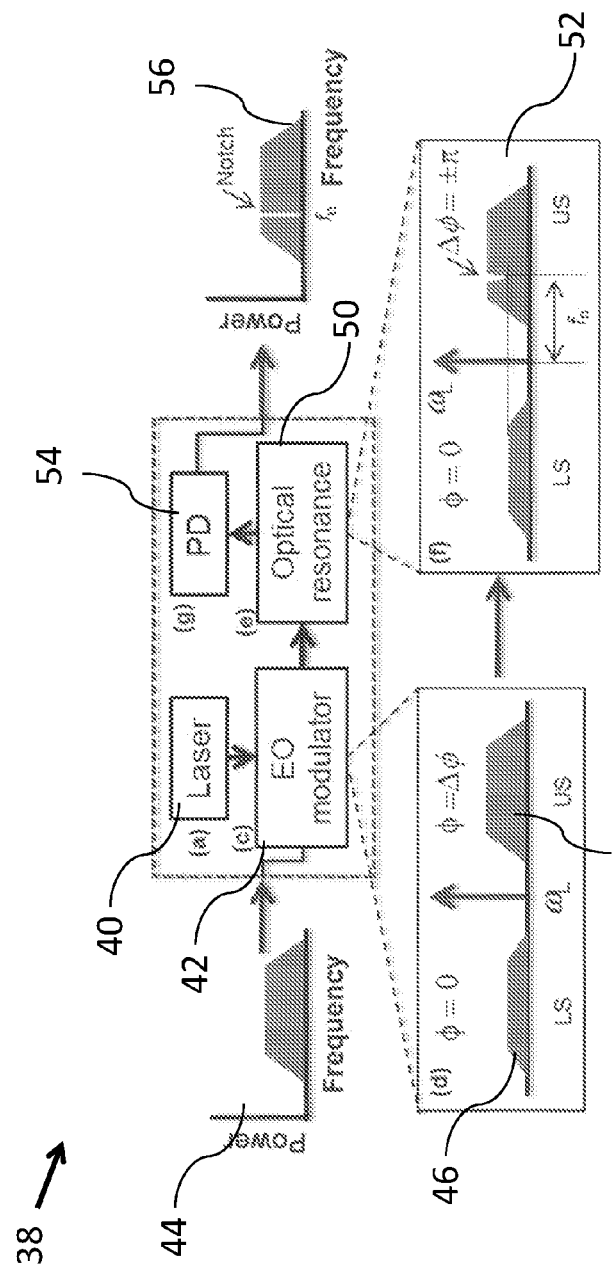
FIG. 3 shows a general, schematic diagram of operation of another embodiment of a device.

FIG. 3 shows a general schematic of operation of another embodiment of a device 38, similar to that of FIG. 1. The device 38 has a laser 40 that generates a continuous optical wave at frequency $\omega_L$ that is received by a modulator in the form of an electro-optic modulator 42. The modulator 42 is driven by the electrical signal that is to have a frequency notch applied thereto, the electrical signal being represented by its power spectrum 44. For sufficiently small modulations, the output of the modulator 42 is the modulated output of the continuous wave laser with lower 46 and upper 48 sidebands around the carrier frequency $\omega_L$. The lower 46 and upper 48 side bands have unequal power, the upper sideband 48 having the greater power in this embodiment. The upper and lower sidebands have a phase difference (The modulator 42 is capable of continuous control over a wide range of sideband amplitudes and phase differences $\Delta\phi$). The output of the modulator 42 is received by an optical signal modifier in the form of an optical resonance system 50. In this but not all embodiments, the optical resonance system is a stimulated nonlinear optical resonance system in the form of a stimulated Brillouin scattering system. The optical resonance system 50 modifies the amplitude and phase of light in one of the upper 48 and lower 46 side bands—the upper in FIG. 2—within the selected frequency band, such that light within the upper and lower side bands corresponding to the selected frequency band is equal and have an antiphase relashionship. This manifests as a notch in the upper side band in the power spectrum 52. The device has an optical-to-electrical converter in the form of a photodiode 54. When the output from the optical resonance system 50 is detected by the optical-to-electrical converter, the beating between the optical carrier and the light within the sidebands corresponding to the selected frequency band cancels and the electrical output of the optical-to-electrical converter 54 is copy of the electrical signal with the selected frequency band supressed—as indicated by the notch in power spectrum 56.

Figure 4:
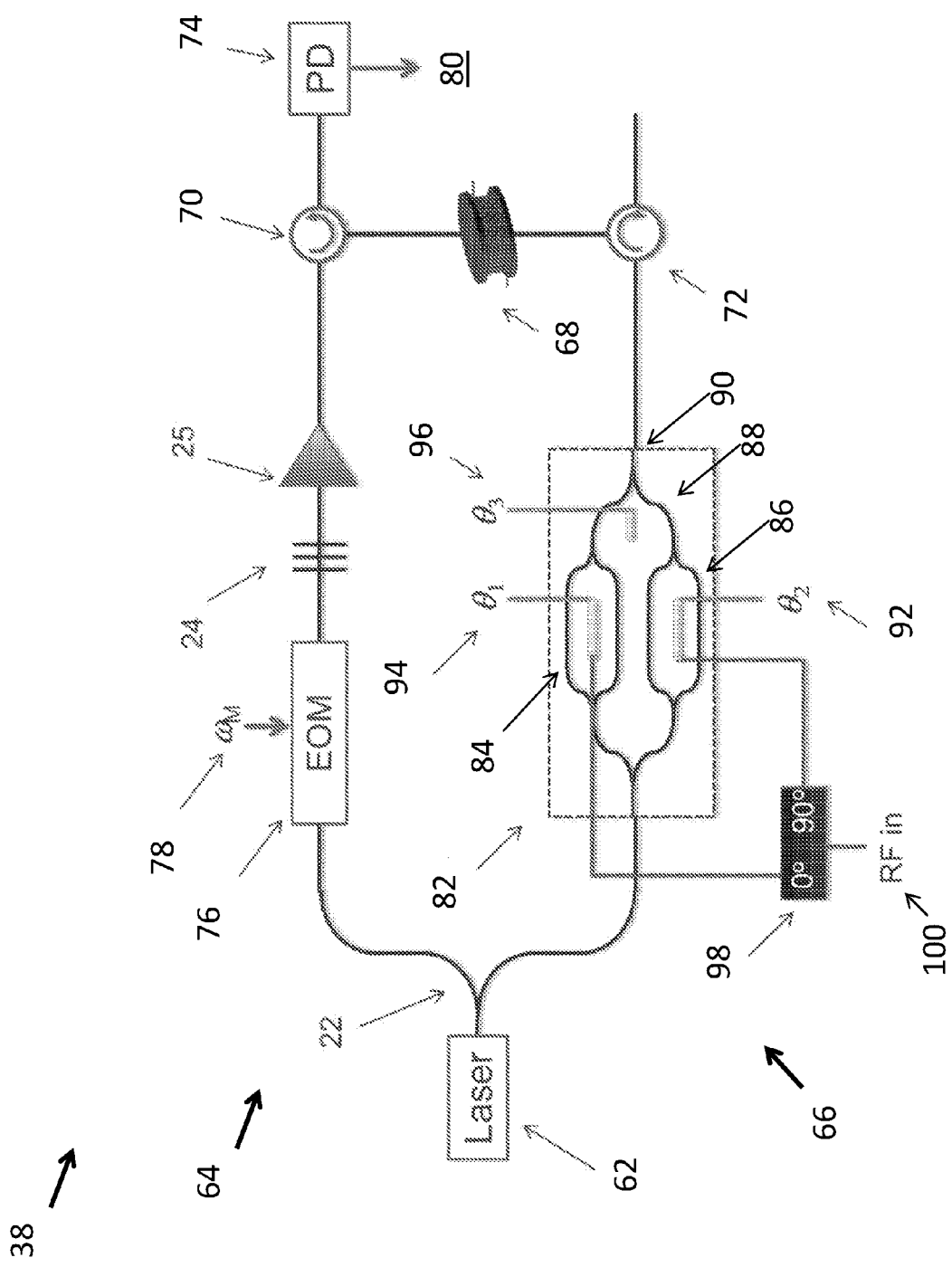
FIG. 4 shows a schematic diagram of the device of FIG. 3.

FIG. 4 shows a schematic diagram of the device of FIG. 3. The device 38 has a laser 62 in the form of a continuous wave erbium doped fibre laser operating at 1550 nm and having, for example, a linewidth of around 100 kHz. The laser 62 may, however, alternatively be a diode laser or generally any suitable type of laser. The output of the laser 62 is coupled into an optical splitter 22 in the form of a fused fibre splitter that splits the laser output between a first arm 64 and a second arm 66. Generally any suitable form of optical splitter may be used, for example beam splitters and coupling optics. The splitting ratio in this embodiment is fixed to 50:50, but any suitable splitting ration may be used, for example 10:90. The first arm 64 is used to generate a tuneable stimulating optical wave. The second arm 66 is used to generate the modulated modulation optical wave with the first and second sidebands.

The modulated modulation optical wave and the tuneable stimulating optical wave are launched into an optical fibre 68, in which they counter-propagate, using two three-port circulators 70,72. The optical fibre has a third order nonlinearity (also known as a Kerr nonlinearity) that will support Brillouin scattering (SBS) and/or Raman scattering (SRS). The optical fibre 68 is a standard single mode fibre, however any suitable fibre may be used, for example a highly nonlinear fibre. In an embodiment another nonlinear optical medium in the form of a nonlinear planar waveguide formed of chalcogenide glass is used. Generally, any suitable nonlinear optical medium may be used.

The stimulating optical wave causes either a Brillouin gain or a Brillouin loss to the modulated optical carrier to equalise the power of light within the first side band corresponding to a selected frequency band and light within the second side band corresponding to the selected frequency band, and to produce an antiphase relationship between the light within the first side band corresponding the selected frequency band and the light within the second side band corresponding to the selected frequency band.

The modified optical signal leaves the fibre 68 and is directed by the optical circulator 70 onto an optical-to-electrical converter in the form of a photodiode 74. The photodiode 74 in this embodiment is model 1444 photodetector sold by NEWPORT, however generally any suitable optical-to-electrical converter may be used, examples of which include biased photoreceivers, and the TEKTRONIX P6703B optical-to-electrical converter. The electrical output 80 of the optical-to-electrical converter 74 is copy of the electrical signal with the selected frequency band supressed.

The first arm 64 ("the tuneable stimulating optical wave generator") will now be described in more detail. The output of the laser 22 passes through an electro-optic (EO) modulator in the form of a Mach-Zehnder modulator 76 to produce a double side-band supressed carrier (DSB) modulated signal. One of the side bands on the DSB modulated signal is selected by a band pass filter in the form of a fibre Bragg grating filter 24 (which may be in alternative embodiments a dielectric filter or generally any suitable filter) and amplified by an optical amplifier in the form of an erbium doped fibre amplifier. Generally, any suitable optical amplifier, for example a semiconductor optical amplifier, may be used. The frequency $\omega_M$ 78 of the electricity that drives the Mach-Zehnder modulator 76 may be changed to change the frequency of the side bands and thus the average frequency of the tuneable stimulating optical wave generator. In an alternative embodiment, the first 64 and second arms 66 each have a respective laser instead of sharing the output of the one laser 62. This may allow greater tuneability of the stimulating optical wave and consequently a greater tuneability of the selected frequency band. The frequency of the tuneable stimulating optical wave is the frequency of the laser output plus or minus $\omega_M$, depending on which side band is selected. The frequency of at least one of the tuneable stimulating optical wave generator and the optical signal is chosen such that the magnitude of the difference in their frequencies is equal to the Brillouin frequency shift of the optical fibre or alternative nonlinear optical medium. If equalisation is achieved by Brillouin loss, then the tuneable stimulating optical wave has a lower frequency than the modulated optical signal side band involved. If equalisation is achieved by Brillouin gain, however, then the tuneable stimulating optical wave has a higher frequency than the modulated optical signal side band involved.

The second arm 66 (the "optical signal generator") has a Mach-Zehnder modulator system in the form of a dual-parallel Mach-Zehnder modulator system 82 (DPMZ) arranged to modulate the modulation optical wave from the laser 62. Generally, any suitable Mach-Zehnder modulator system may be used, for example one having a dual drive Mach-Zehnder Modulator (DDMZ). The Mach-Zehnder modulator system 82 comprises a plurality of component modulators 84, 86, 88 in communication with an optical output 90 of the Mach-Zehnder modulator system 82. The Mach-Zehnder modulator system 82 also has biasing electronics arranged to apply an independent voltage bias 92, 94, 96 to each of the plurality of component modulators.

An electrical signal splitter 98 is arranged to split the electrical signal 100 into a plurality of split electrical signals and drive two of the component modulators 84, 92 with a respective one of the plurality of split electrical signals. The electrical signal splitter is arranged to cause one of the plurality of split electrical signals to be out of phase—by 90 degrees—with respect to another one of the plurality of split electrical signals.

While the embodiment of FIG. 4 employs Brillouin scattering, other embodiments may use another optical resonance. For example, the stimulated nonlinear optical resonance system may be a stimulated Raman scattering system. Silicon, for example, has a Raman gain spectrum that may be used in certain circumstances. The Raman gain in silicon has a bandwidth of ~100 GHz. While the narrow SBS spectral response (10's of MHz) enables microwave photonic notch filter for narrowband RF signals, Raman gain is of particular interest for wideband RF signals. The optical resonance system may comprise a plurality of atoms having an optical resonance, for example a glass doped with neodymium, erbium or some other atoms of a rare earth or transition element, or a gas cell. The optical resonance system may comprise a linear optical resonance structure. The linear optical resonance structure may comprise one of a ring resonator, a Fabry-Perot resonator, a Bragg grating, and a photonic crystal for example.

Modelling and Simulation

In small signal approximation, an optical modulation of a band limited radio frequency (RF) signal $A(\omega_{RF})$ onto an optical carrier (the output of the laser 62, for example) with a frequency $\omega_c$ will result in two optical sidebands are around the optical carrier. A general expression of the modulated optical field can be written as:

$$E(t) = e^{j\omega_c t}\left(E_c + \int_{\infty}^{-\infty} E_-(\omega_{RF})e^{-j\omega_{RF}^t t}\,d\omega_{RF} + \int_{\infty}^{-\infty} E_+(\omega_{RF})e^{j\omega_{RF}^t t}\,d\omega_{RF}\right) \quad (1)$$

Here $\omega_{RF}$ is the radio frequency, $E_c$ is the amplitude of the optical carrier after the modulation, and $E_-(\omega_{RF})$ and $E_+(\omega_{RF})$ are the amplitudes of the lower and the upper sidebands, respectively, which are proportional to $A(\omega_{RF})$.

For simplicity, consider a case of tone modulation, where the optical field is modulated by a single frequency sine or cosine wave. In this case, $A(\omega_{RF})$, and subsequently $E_-(\omega_{RF})$, and $E_+(\omega_{RF})$, are independent of the RF frequency. In the case of DPMZ, with an RF half-wave voltage of $V_\pi$, driven by an RF signal with a voltage amplitude of V, one can re-write Equation (1) as $$E_{DPMZ}(t) = e^{j\omega_c t}(E_c + E_- e^{-j\omega_{RF}t} + E_+ e^{j\omega_{RF}t}) \quad (2)$$

With $$E_- = J_1(\beta)\{-\sin\theta_2 \cos\theta_3 - j(\sin\theta_1 + \sin\theta_2 \sin\theta_3)\} \quad (3)$$

$$E_+ = J_1(\beta)\{-\sin\theta_2 \cos\theta_3 + j(\sin\theta_1 - \sin\theta_2 \sin\theta_3)\} \quad (4)$$

$$E_c = J_0(\beta)\{\cos\theta_1 + \cos\theta_2 \cos\theta_3 + j(\cos\theta_2 \sin\theta_3)\} \quad (5)$$

Here $E_c$, $E_-$, and $E_+$ are the complex amplitudes of the carrier, lower, and upper sidebands, respectively. $J_n$ is the $n^{th}$ order Bessel function of the first kind, $\beta = \pi V/V_\pi$ is the modulation index, and $\theta_i$ are the DPMZ biases.

The SBS gain (Stokes) spectrum can be written as complex transfer function in the form of $$H_S(\omega) = \exp(g_{SBS}(\omega-\Omega))\exp(j\phi_{SBS}(\omega-\Omega)) \quad (6)$$

while the anti-Stokes (loss) spectrum can be written as $$H_{AS}(\omega) = \exp(-g_{SBS}(\omega+\Omega))\exp(-j\phi_{SBS}(\omega+\Omega)) \quad (7)$$

With $$g_{SBS}(\omega) = \frac{G\omega_B^2}{4\omega^2 + \omega_B^2} \quad (8)$$

$$\phi_{SBS}(\omega) = \frac{G\omega\omega_B}{4\omega^2 + \omega_B^2} \quad (9)$$

Here, $\Omega$ is the SBS frequency shift from the pump frequency, $G = G_0 L_{eff}$ is the multiplication of SBS maximum power gain coefficient ($G_0$), which is linearly proportional to the pump intensity, and effective length, $L_{eff}$. Here $\omega_B = 2\pi\upsilon_B$, where $\upsilon_B$ is the full-width half maximum (FWHM) of the Brillouin linewidth.

One of SBS responses in (6) or (7) is then used to filter one of the optical sidebands in (2), and these optical signals are sent to a photodetector to form the notch filter. The photocurrent is proportional to the intensity of the optical signals. However, this current also consists of a DC term and higher order terms, while the RF photocurrent at the desired signal frequency is proportional to the mixing between the optical carrier and the sidebands. In the case where the SBS gain is used to filter the upper sideband, the RF photocurrent, $I_D$, can be written as, $$I_D \propto |E_c\{H_S(\omega)E_+ + E_-\}| \quad (10)$$

The RF power is proportional to the square of the photocurrent $$P_{RF} \propto I_D^2 R_L \quad (11)$$

Here $R_L$ is the load resistance.

Figure 5:
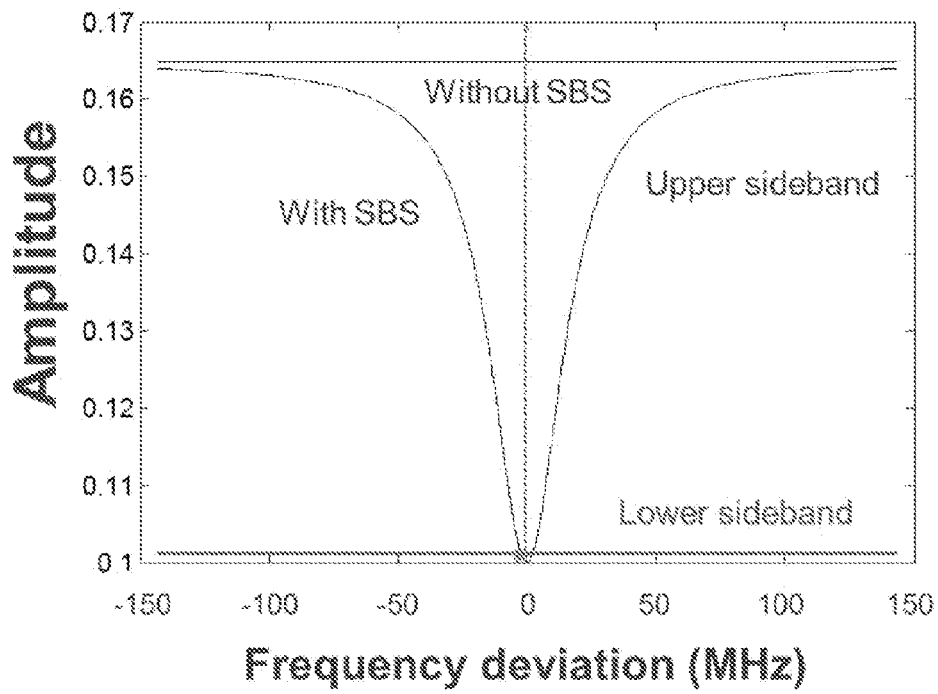
FIG. 5 shows a simulated amplitude response of sidebands.
Figure 6:
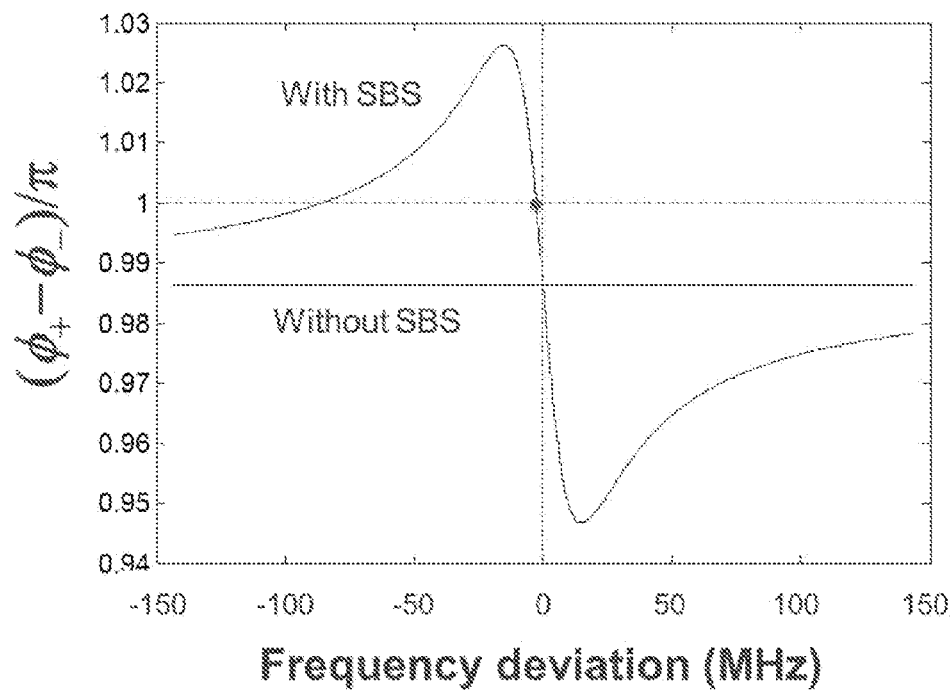
FIG. 6 shows a phase difference of the sidebands of FIG. 5 as a function of the frequency deviation from a stimulated Brillouin scattering central frequency.

The notch filter is formed when the sidebands are equal in amplitude and are of opposite phase at a specific frequency band. Initial amplitude ratio and phase (difference) offset of the sidebands are provided by setting the biases of the DPMZ ($\theta_1$, $\theta_2$, and $\theta_3$). Once the initial setting is achieved, the SBS gain or loss response is used to bring the amplitude ratio to unity and the phase difference between the sidebands to be $\pm\pi$. FIG. 5 shows the simulated amplitude response of the sidebands. FIG. 6 shows the phase difference of the sidebands as functions of the frequency deviation from the SBS central frequency. The frequency of which the amplitude and phase conditions are met is indicated by a dot in each graph. For these simulations, $\theta_1 = 0.147\pi$, $\theta_2 = 1.2\pi$, and $\theta_3 = \pi$. Here we have used simulation parameters $G = 1$ and $\upsilon_B = 30$ MHz, such that the maximum value of Equation (8) is 2.17 dB.

Figure 7:
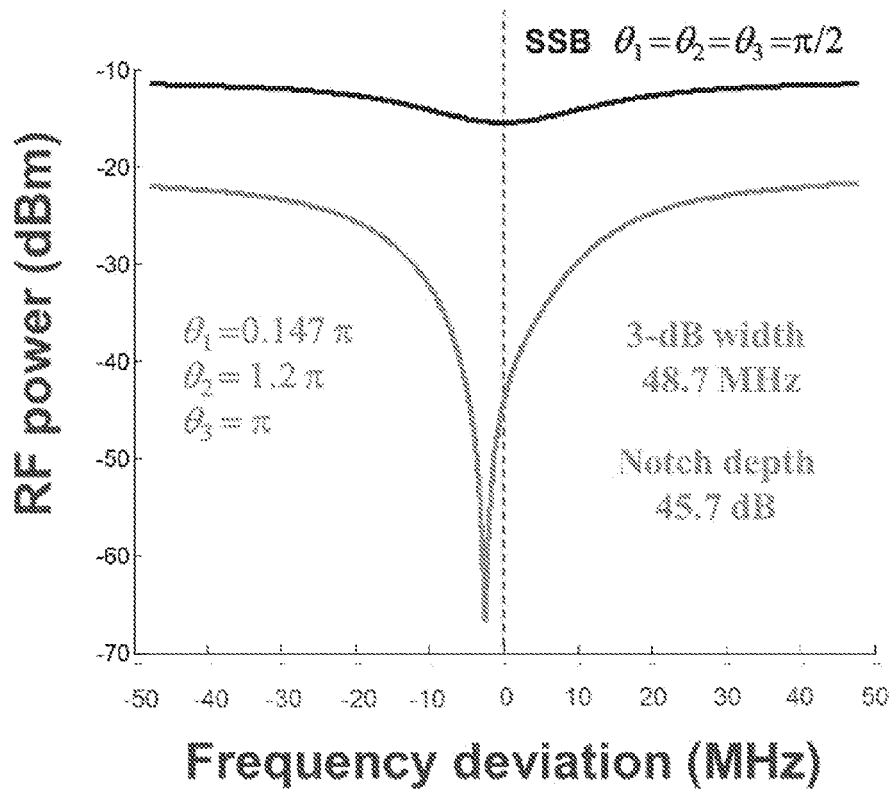
FIG. 7 shows an example of a notch response generated using an embodiment of the device.

The generated notch response using this technique is depicted in FIG. 7. The response shows a very narrow 3-dB width (measured from the pass-band) of 48.7 MHz and a very deep notch attenuation of 45.7 dB.

To highlight the quality of the formed notch using this technique, the response is compared to the notch response formed using a single sideband (SSB) modulation. In this case, the biases are set as $\theta_1 = \theta_2 = \theta_3 = \pi/2$. Hence $E_-$ in (10) vanishes, leaving the SBS loss spectrum in (7) imparted on $E_+$ to be directly down-converted to the microwave domain via mixing with the optical carrier. Note that for SSB operation, the SBS phase response in (9) does not play any role. Since the SBS gain used in the simulation is very low, the SSB notch response is very shallow and broad.

This comparison highlights the key point of the invention, which is energy efficiency. Using low SBS gain, this technique still enables notch formation with a very high quality (i.e. narrow band and high extinction), which would have not been possible when SSB modulation is used.

Figure 8:
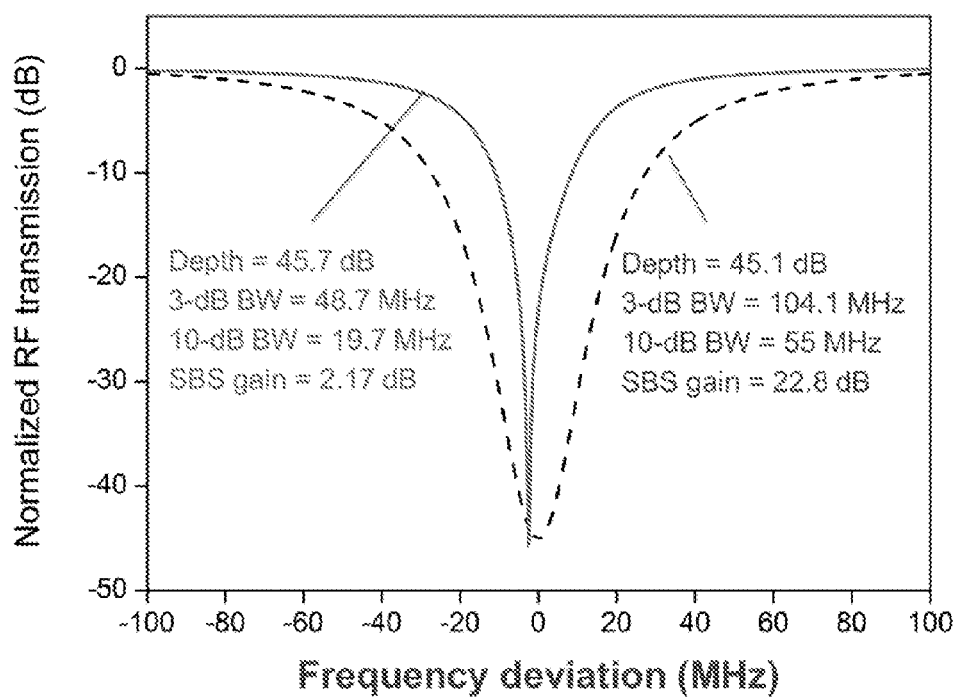
FIG. 8 shows a normalised transmission as a function of frequency deviation.

To concretely determine the energy saving offered by the novel filter, we compare the filter performance with an SSB operation with the same notch attenuation (approximately 45 dB). The results are shown in FIG. 8. An SSB operation would require SBS gain of 22.8 dB to achieve the same attenuation. This means that the novel technique offers energy saving with a factor of 100. FIG. 8 also shows that even with a much higher gain, SSB operation cannot achieve the narrow 3-dB and 10-dB bandwidths achieve with the novel technique.

Figure 9:
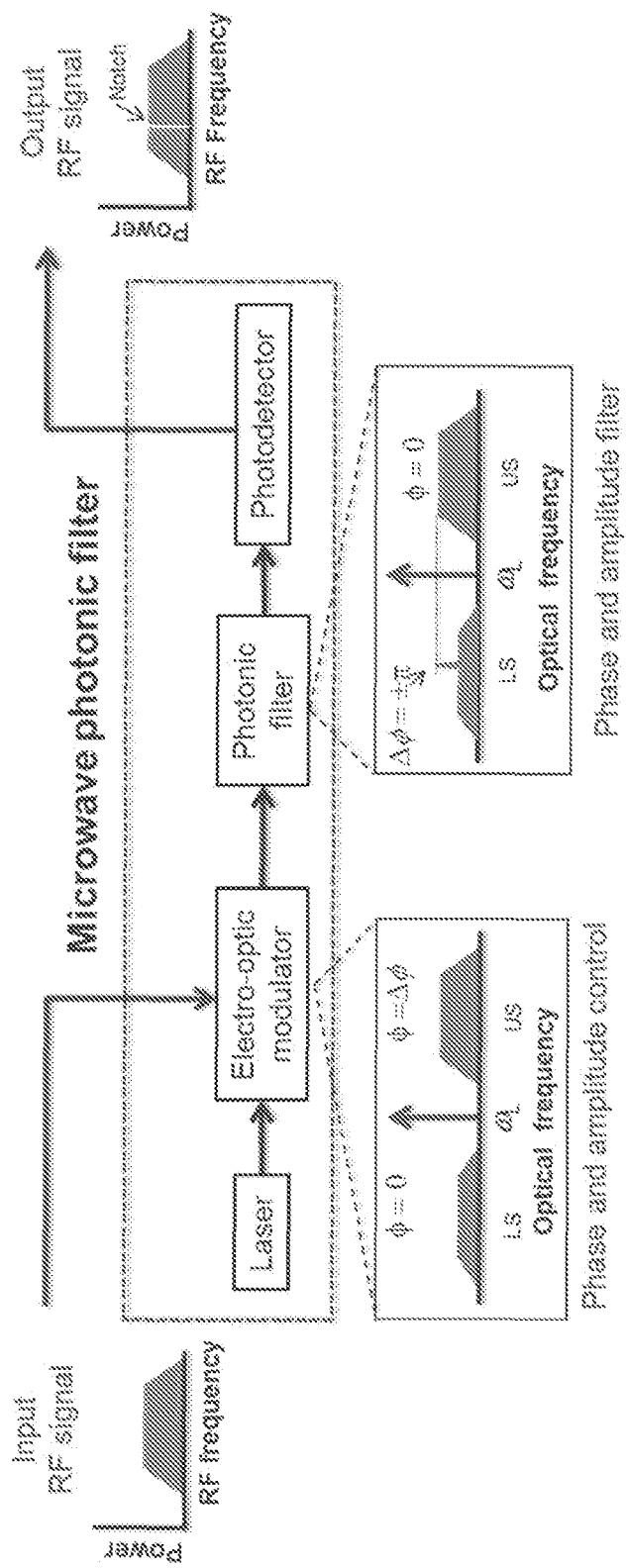
FIG. 9 shows a schematic diagram illustrating an alternative operation of the device of FIG. 1.

As described above, the notch filter can also be formed using the gain spectrum of SBS. Instead of attenuating a sideband with larger amplitude using the loss spectrum, one can instead amplify the weaker sideband to achieve the condition of equal amplitude and opposite phase. This is illustrated in FIG. 9.

Figure 10:
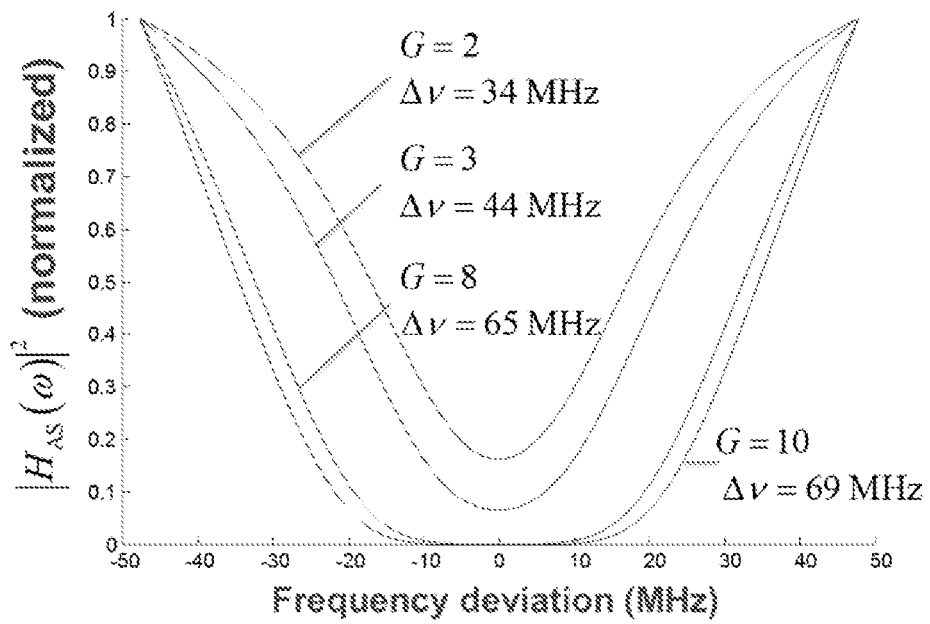
FIGS. 10 and 11 show graphs of normalised complex transfer functions of the SBS loss and gain.
Figure 11:
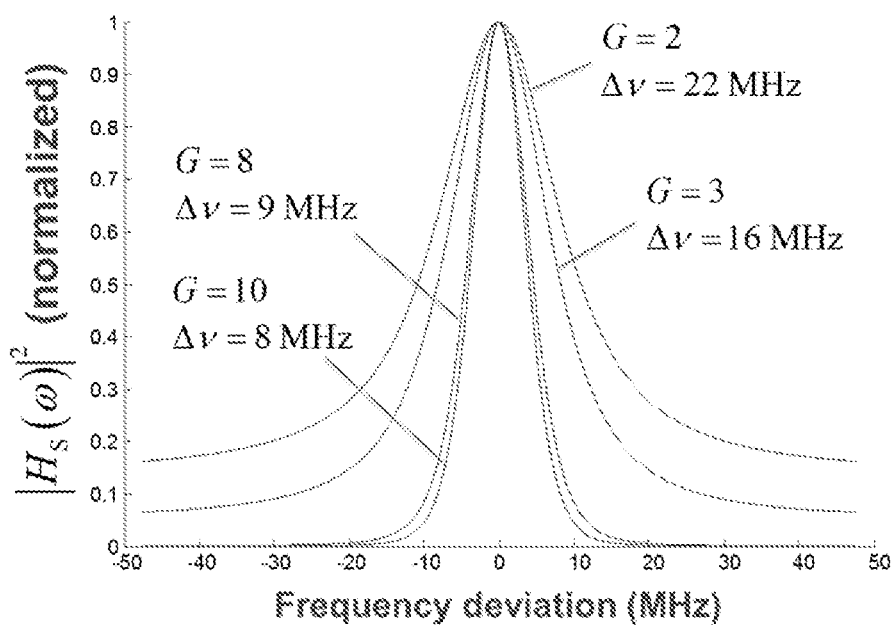
Figure 12A:
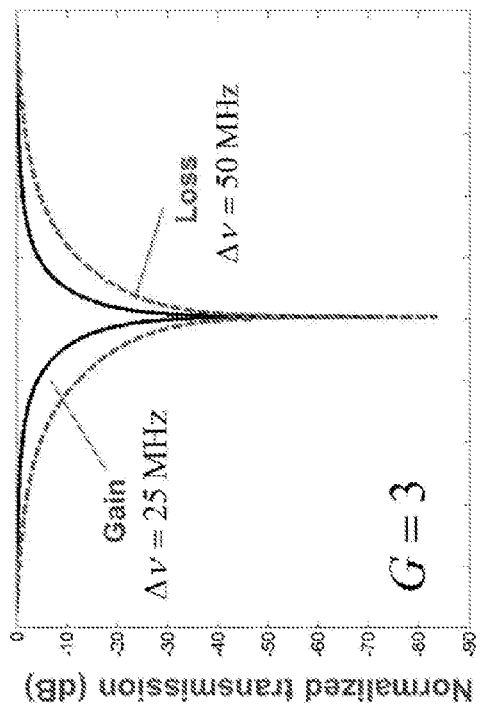
FIGS. 12a to 12d show graphs showing the performance of a modelled embodiment of a device.
Figure 12B:
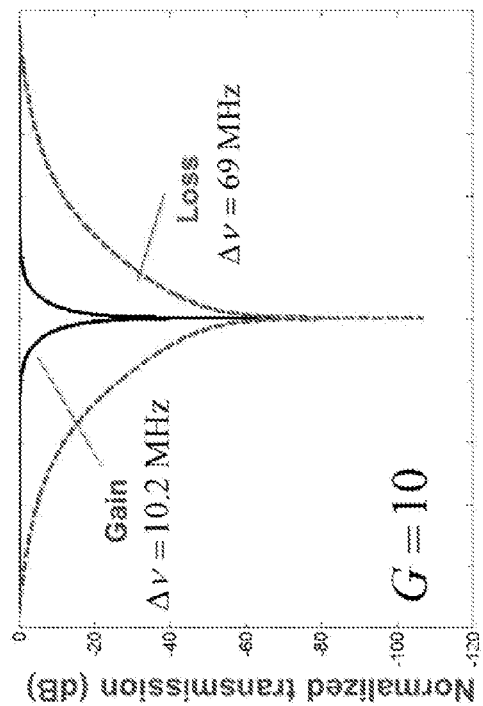
Figure 12C:
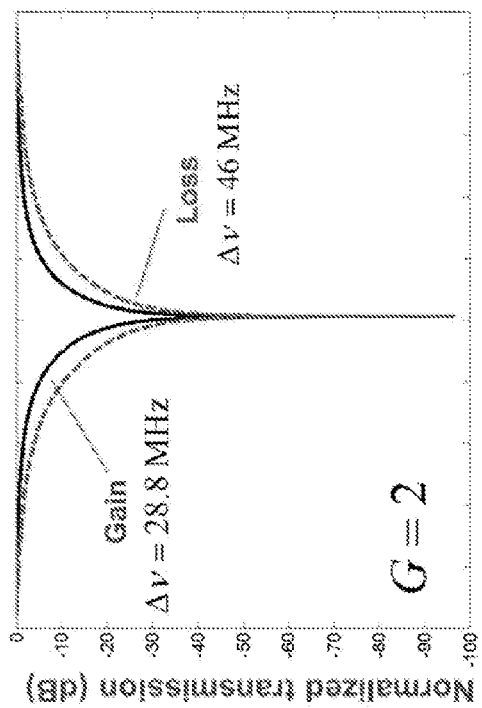
Figure 12D:
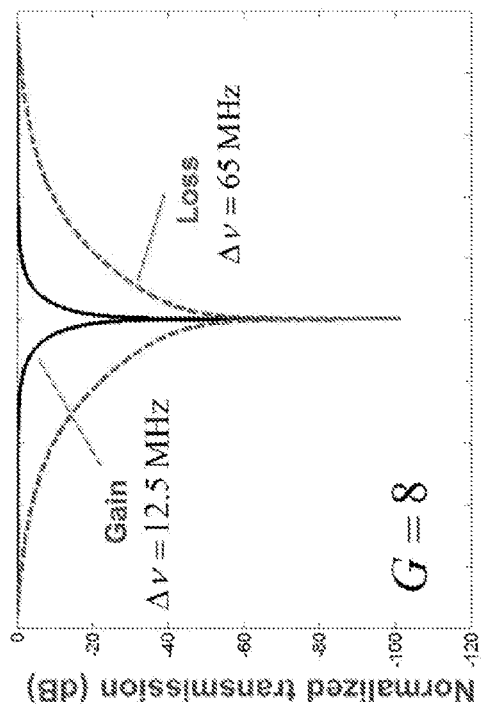

Using the gain spectrum of SBS instead of the loss spectrum may further reduce the 3-dB bandwidth of the MWP filter. Recall that from Equations (10) and (11) that the filter response, i.e., the RE power, is proportional to the magnitude square of the SBS transfer function, i.e.

$$P_{RF} \propto |H_k(\omega)|^2 \quad (12)$$

Where k=S, AS, indicates the Stokes (gain) or anti-Stokes (loss) spectrum. FIG. 10 shows the normalized value of $|H_S(\omega)|^2$ and FIG. 11 shows the normalised value of $|H_{AS}(\omega)|^2$ plotted for various values of G (Eq. 8) to illustrate the 3-dB bandwidth dependence of the RE responses.

It is clear that for increasing G, $|H_{AS}(\omega)|^2$ is getting broader and flatter around the centre frequency, while $|H_S(\omega)|^2$ is getting narrower and steeper as the frequency deviation increases from the centre. This trend is translated to the performance of the novel MWP filter as shown in FIGS. 12a to 12d.

Experiment Results

Figure 13:
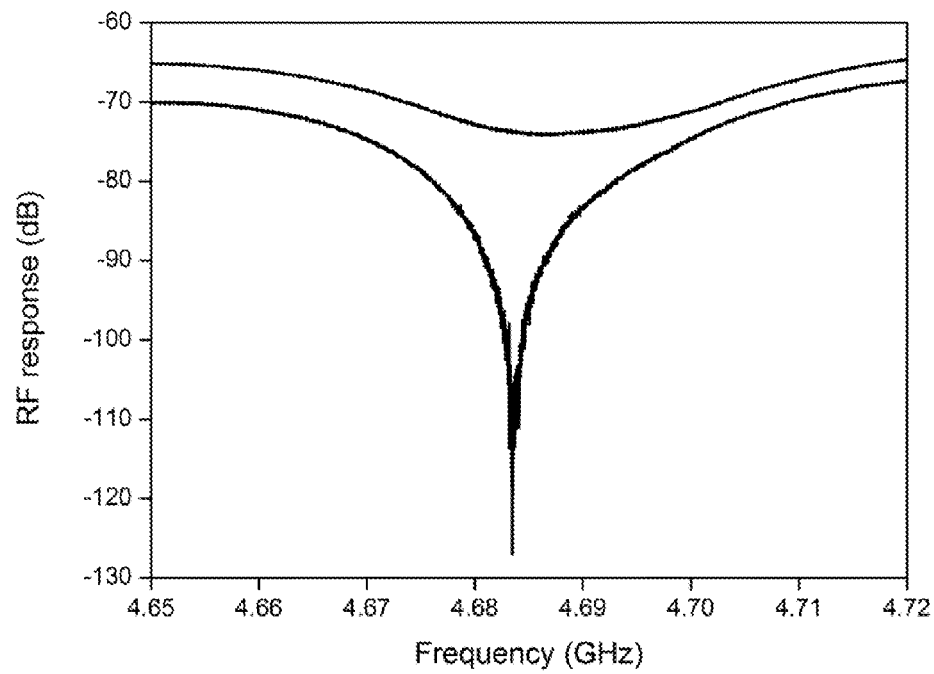
FIG. 13 compares a stimulated Brillouin scattering response to suppression achieved in a model of an embodiment of the device.

The applicants successfully demonstrated the invention in a experiment. 650 m of standard single-mode fibre was used as the SBS medium. The comparison between the frequency response of the novel technique and the SSB operation is shown in FIG. 13. SSB operation shows attenuation of 9 dB while the novel filter shows attenuation up to 57 dB, with a narrow 3-dB bandwidth of 35 MHz. With better modulator tuning, a record performance of 3-dB width as low as 27 MHz, with a very high attenuation of 51 dB was achieved.

Figure 14:
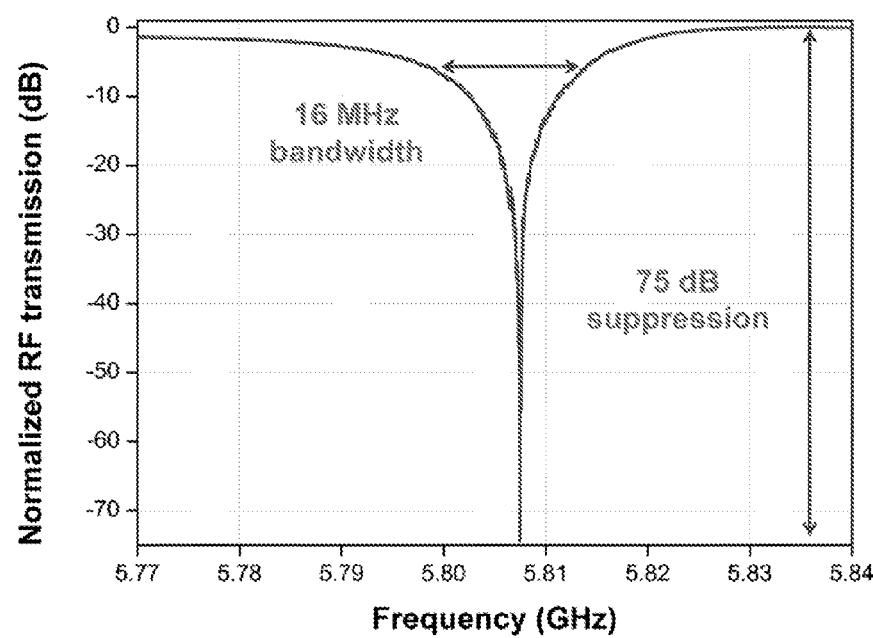
FIGS. 14 and 15 shows graphs demonstrating performance of embodiments of the device.

As expected from simulations, dramatically improved performance was obtained using the SBS gain. A filter response with a narrow bandwidth of 16 MHz bandwidth and an ultra-high suppression of 75 dB was measured (FIG. 14).

Figure 15:
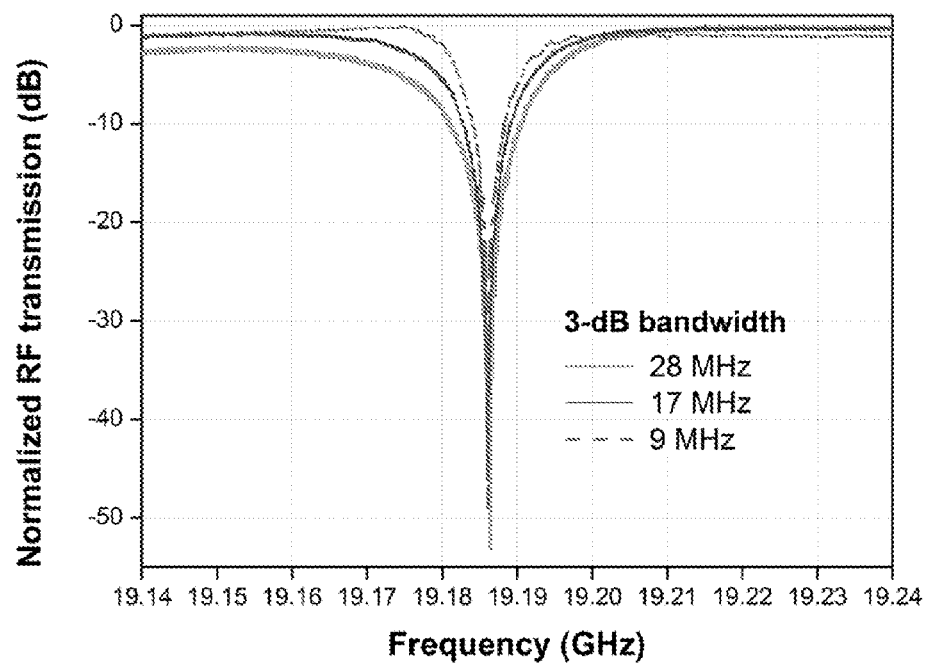

By means of varying the SBS pump power, bandwidth tuneable filter is obtained. The 3-dB bandwidth can be tuned from 140 MHz to 9 MHz, with three different values from 28 MHz down to 9 MHz were experimentally demonstrated (FIG. 15).

By means of varying the SBS pump power, bandwidth tuneable filter is obtained. The 3-dB bandwidth can be tuned from 140 MHz to 9 MHz, with three different values from 28 MHz down to 9 MHz were experimentally demonstrated (FIG. 15).

Alternative Embodiments

Alternative embodiments may use another type of optical resonance, for example a linear optical resonance structure in the from of a filter.

Figure 16:
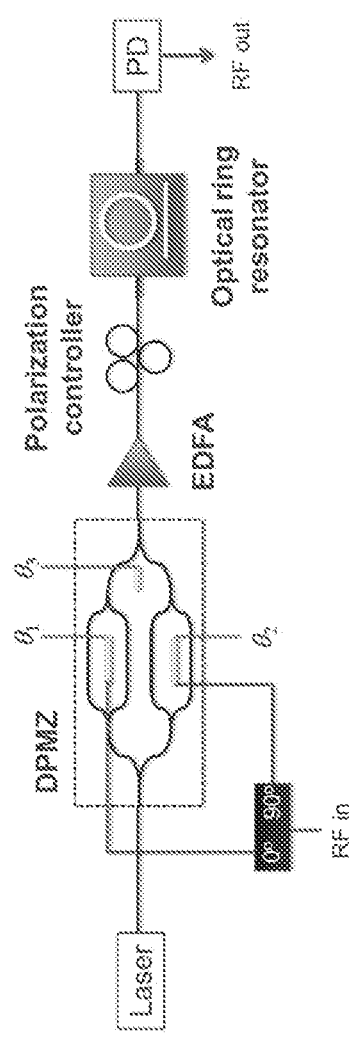
FIGS. 16 and 17 show schematic diagrams of alternative embodiments of the device.
Figure 17:
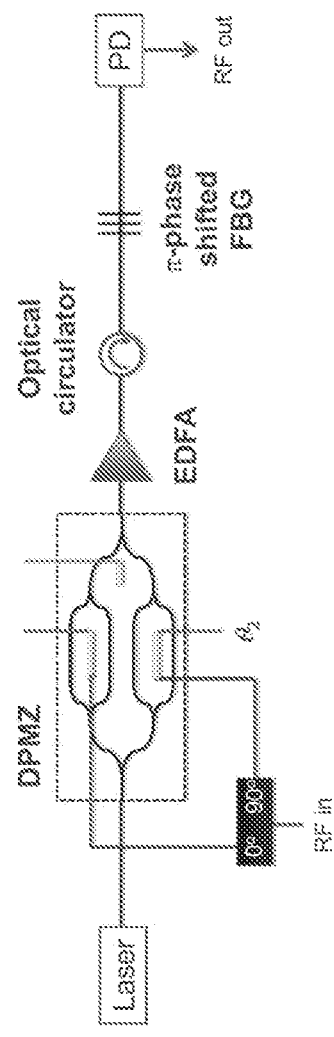

Simulations and measurements using various types of optical filters have been performed, including an integrated optical ring resonator (FIG. 16) and π-phase-shifted grating in transmission (FIG. 17).

Figure 18:
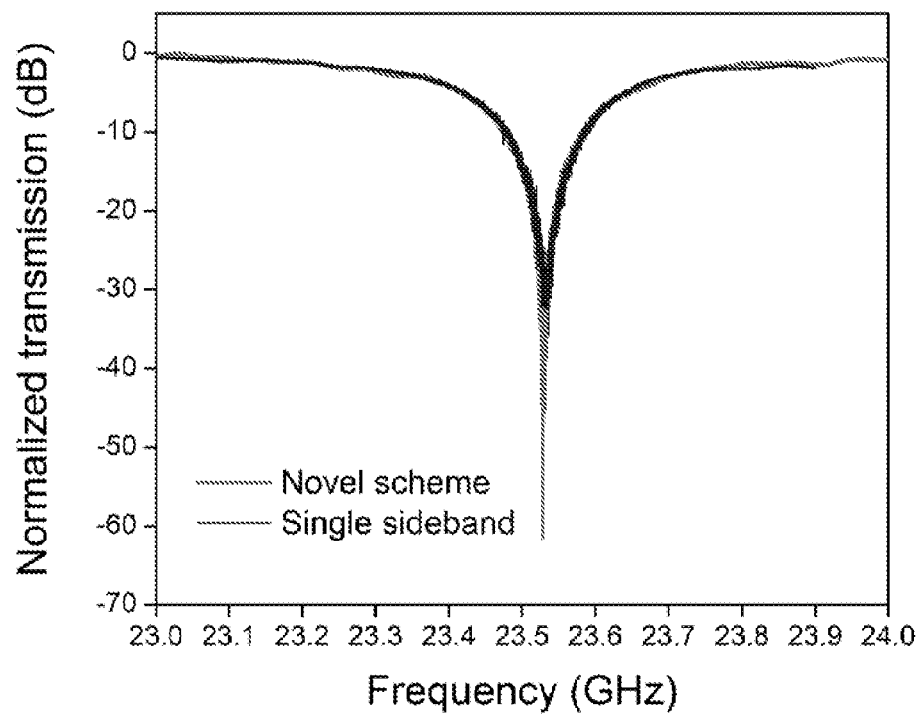
FIG. 18 shows results using an embodiment of a device having a ring resonator.

Embodiments were used to enhance the suppression of a through response of an optical ring resonator filter in the microwave domain by around 30 dB (FIG. 18). The ring used in the experiments was a silicon nitride ring with a free-spectral range of 19.5 GHz.

Figure 20:
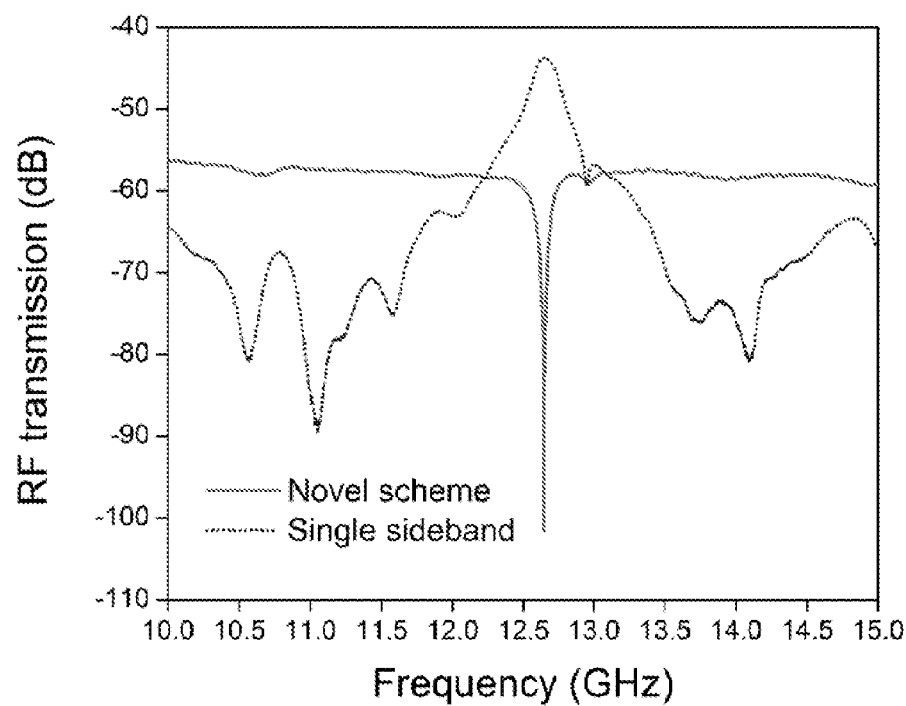
FIGS. 19 and 20 shows a resonance of an embodiment of a device.
Figure 19:
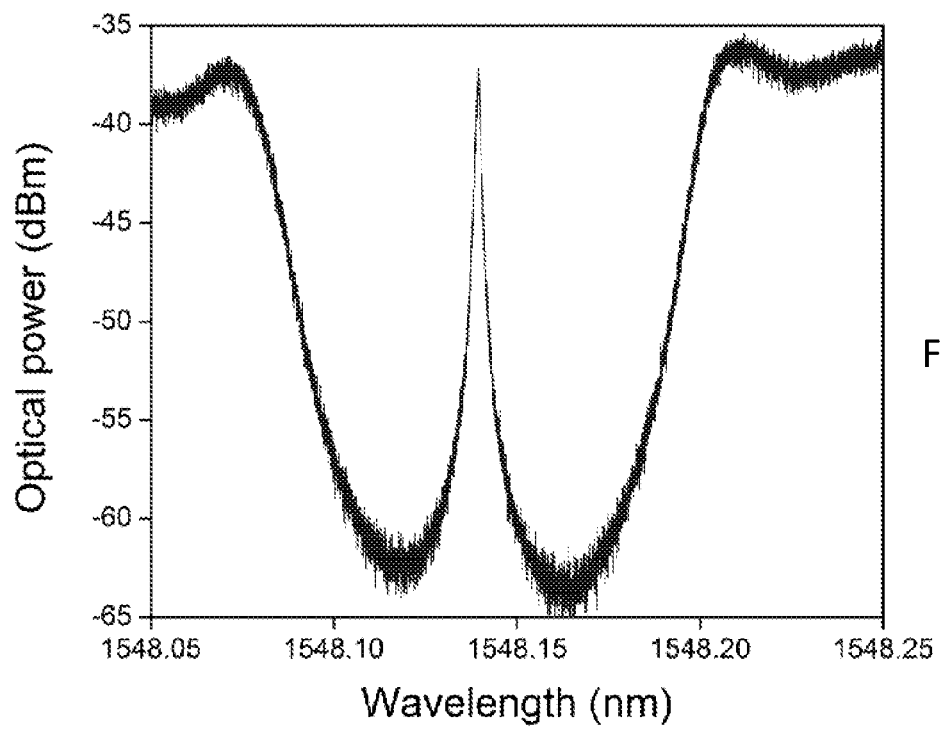

As the second alternative embodiment, a π-phase-shifted fibre Bragg grating was used as the optical filter. The π-phase-shifted fibre Bragg grating exhibited a sharp resonance inside the stop-band of the FBG (FIG. 19). An embodiment was then used to create a narrow width (160 MHz 3-dB bandwidth) microwave notch filter with a suppression around 50 dB. This response is depicted in FIG. 20 together with the SSB response of the π-phase-shifted fibre Bragg grating response, which is a band-pass response.

Now that embodiments have been described, it will be appreciated that some embodiments may have one or more of:

A more narrow frequency response than that of state-of-the-art devices of the prior art. One embodiment has a record-narrow attenuation response, with 3 dB and 10 dB bandwidths of 9 MHz and 4.5 MHz respectively, which are lower than the SBS line width.

A peak attenuation that may be greater than that of state-of-the-art devices of the prior art. Ultrahigh suppression of 75 dB was achieved using one embodiment. One embodiment had a high stop-band attenuation of 51 dB, achieved with a very low SBS gain of 2 dB.

Ultrawide frequency tuneability of the notch central frequency, for example 1-30 GHz A significantly more tuneable centre frequency.

Energy efficient operation.

A better filter performance in terms of combined peak attenuation, bandwidths, tuning range, and energy efficiency than state-of-the-art devices of the prior art.

Figure 21:
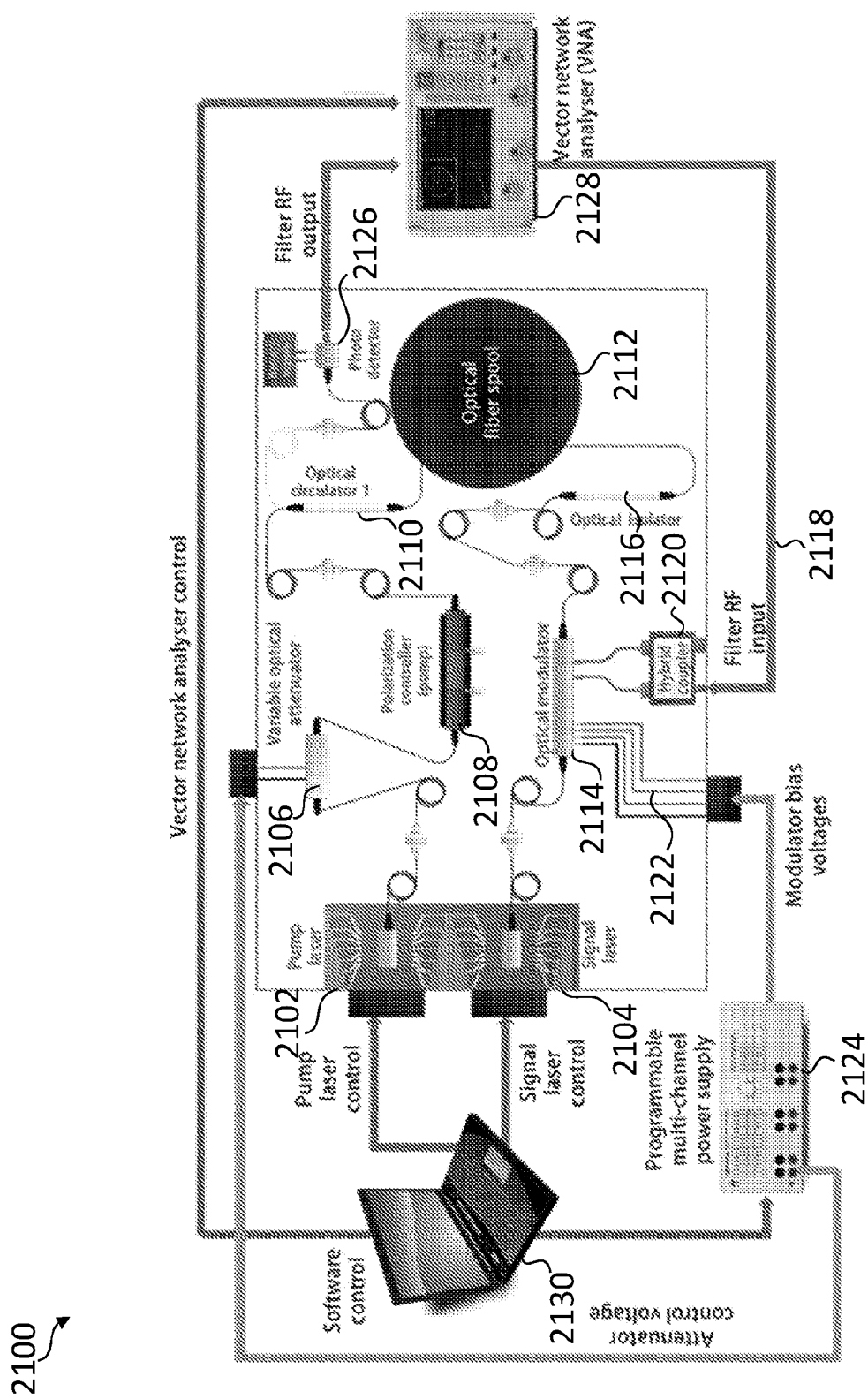
FIG. 21 shows a schematic diagram of a further embodiment of the device.

FIG. 21 shows a further embodiment 2100 of the device. Device 2100 comprises two lasers, a pump laser 2102 and a signal laser 2104, instead of a single laser as in FIG. 4, for example. The output of pump laser 2102 is connected to a variable optical attenuator 2106, which is connected to a polarisation controller 2108. The output of the polarisation controller 2108 is connected via an optical circulator 2110 to an optical fibre spool 2112.

The signal laser 2104 is connected to an optical modulator 2114 with polarization maintaining pigtails as described above. The output of the optical modulator 2114 is then connected via an optical isolator 2116 to the spool 2112.

An RF signal 2118 is provided to the optical modulator 2114 by a hybrid coupler 2120 and the optical modulator 2114 is configured by three control voltages 2122 generated by a multi-channel power supply 2124. The signal from the spool 2112 is detected by photo detector 2126 resulting in an RF output signal that is analysed by a vector network analyser 2128. The power supply 2124, the pump laser 2102, the signal laser 2104 and the network analyser 2106 are controlled by a computer 2130.

Although computer 2130 is shown as a laptop computer in FIG. 2100, it is to be understood than any electronic computing device, such as a micro-controller, microprocessor, signal processor or FPGA, may equally be used. The computer 2130 may also be located remotely from filter device 2100 and communicatively coupled to the network analyser 2128, the power supply 2124 and the lasers 2102 and 2104 via a communication network, such as the Internet, or wirelessly via W-LAN.

The optical power of the pump laser 2102 that is fed into the spool 2112 is controlled by the voltage-controlled variable optical attenuator 2106. By controlling this optical power, the computer 2130 can tune the bandwidth of the microwave notch filter 2100 as described below.

In the embodiment of FIG. 21 component count is reduced and only one polarization controller 2108 is present in the device 2100 (instead of two). In particular, the signal generator to generate the frequency $\omega_M$ 78 in FIG. 4 can be bulky and is not present in the embodiment of FIG. 21. To further simplify the setup, the 3-port circulator 72 in FIG. 4 in the signal path is replaced with the optical isolator 2116.

The power supply 2124 is a 4-channel programmable power supply to supply voltage to both the modulator 2114 and the variable optical attenuator 2106. Three of the channels 2122 (92, 94, 96 in FIG. 4) are connected to control the three bias voltages of the modulator 2114 while one channel is used to control the optical attenuator 2106. In another example, the power supply 2124 is a multi-channel digital to analog converter (DAC).

In one example, computer 2130 comprises a processor that executes software stored on program memory, such as on a hard disk (not shown), and written in LabVIEW to communicate and control the lasers 2102 and 2104, programmable power supply 2124, and the vector network analyser 2128. In this sense, computer 2130 performs the method of FIG. 22 for controlling a filter device that generates an electrical signal with a suppressed frequency band.

The software is used to control the injection currents and the temperatures of the two lasers 2102 and 2104. Controlling the injection current and temperature of the pump laser 2102 will set the optical power and the emission wavelength/frequency of the pump. Similarly, controlling the current and temperature of the signal laser 2104 will set its emission power and frequency.

By software controls of lasers 2102 and 2104, the difference in lasers emission wavelengths can be controlled. This frequency difference will eventually set the centre frequency of the filter. Thus, software control of the filter RF frequency is achieved in this way.

Software control of the programmable power supply 2124 is used to control the voltages to the optical modulator 2114 and the variable optical attenuator 2106. The voltage to the attenuator 2106 sets pump power and as a result, the bandwidth of the filter. The voltages to the modulator 2114 set the cancellation condition necessary to achieve high suppression notch. Thus, in this way, software control of the filter bandwidth and filter suppression is achieved.

Software control of the vector network analyser 2128 is used to retrieve measurement data from the analyser 2128. In one example, this measurement data can be used in a feedback loop to actively control the filter characteristics. For example, by monitoring the filter centre frequency from the network analyser 2128, the computer 2130 can use a software algorithm to actively control the injection currents and temperatures of lasers 2102 and 2104 to keep the centre frequency at the desire value, possibly in a feedback loop configuration.

Figure 22:
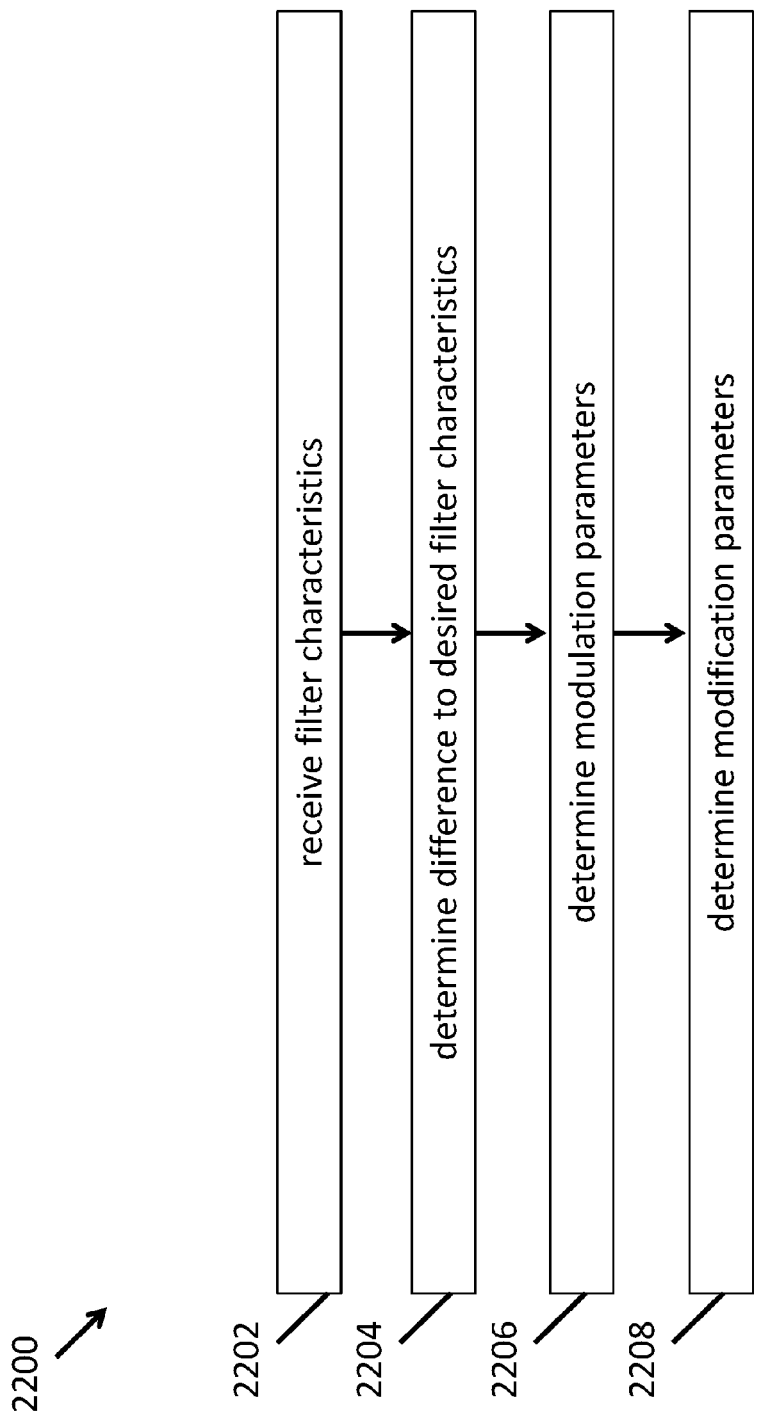
FIG. 22 illustrates a method for controlling a filter device.

FIG. 22 illustrates a method 2200 for controlling a filter device, such as filter device 2100 of FIG. 21. As mentioned before, method 2200 is implemented as software, such as in LabView, and stored on program memory of computer 2130.

Computer 2130 performs the method and receives 2202 actual output characteristics of the filter based on an output signal of the filter device through an input port, such as a USB, firewire, W-LAN or Bluetooth, I2C or serial interface. For example, an RF sweep signal is applied by the network analyser 2128 to the input of the filter device 2100, that is, the input of the hybrid coupler 2120. The network analyser 2128 then measures the amplitude of the output signal from photo detector 2126 for each frequency of the frequency sweep and determines the output amplitude and attenuation at each frequency.

One output characteristic may be the filter stop-band attenuation, which is defined by the ratio of pass-band amplitude to stop-band amplitude in dB. Typically, a set of desired output characteristics are pre-defined, such as by a user inputting the desired characteristics by adjusting control nobs on the filter device which are connected to the computer 2130, by inputting data values into a user interface displayed on computer 2130 or by providing a control file or other digital control data to the computer 2130.

In one example, the desired filter characteristics are 3 dB bandwidth, stop-band attenuation and centre frequency. It is noted here that the desired stop-band attenuation may be a specific dB value, such as 60 dB but may equally be an extreme value, such is 'infinity' or 'maximum'. In case of such extreme values, the filter is set-up such that maximal equalisation is achieved, which means the aim is perfect equalisation. In other cases, the filter is set-up such that the equalisation is achieved to a lesser degree that results in the desired stop-band attenuation.

The computer 2130 determines 2204 a difference between the actual output characteristics and desired output characteristics, such as by subtracting the actual output characteristics from the desired output characteristics. However, a binary smaller/greater assessment may also be used as a difference.

The computer 2130 then determines 2206 based on the difference modulation parameters. The modulation parameters are those influencing the signal path from the signal laser 2104 through the modulator 2114 to the spool 2112. In contrast, the modification parameters are those influencing the pump path from pump laser 2102 through the attenuator 2106 to the spool 2112.

Figure 23:
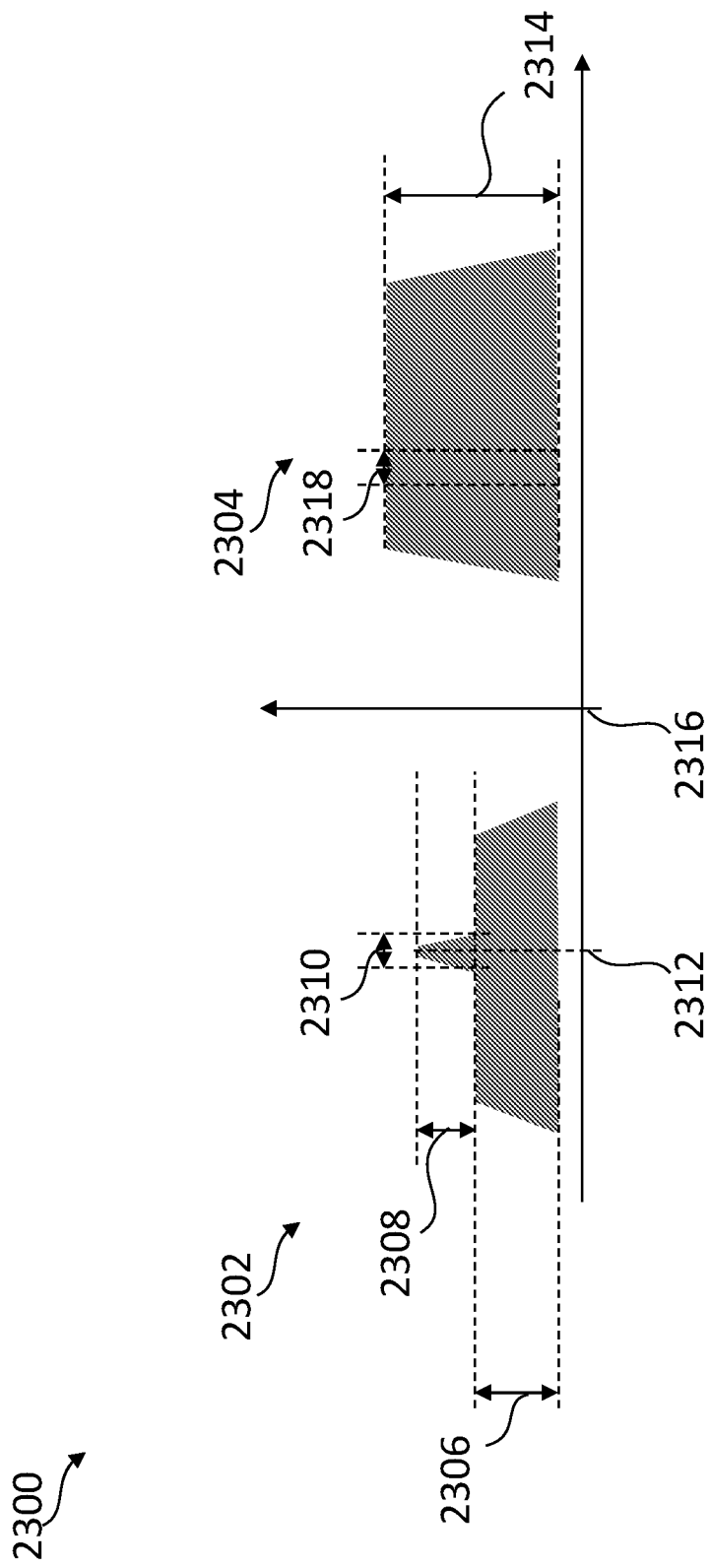
FIG. 23 illustrates the influence of the modulation and modification parameters on the filter spectrum.

FIG. 23 illustrates the influence of the modulation and modification parameters on the filter spectrum 2300 comprising a lower sideband 2302 and an upper side band 2304 in the example of using SBS gain. The lower sideband 2302 is characterised by the lower sideband amplitude 2306, the SBS gain 2308, the SBS bandwidth 2310 and the SBS centre frequency 2312, which is the centre frequency of the SBS response. The upper sideband 2304 is characterised by the upper sideband amplitude 2314.

The filter spectrum 2300 is located around the carrier frequency 2316. Within the upper sideband 2306 there is indicated a bandwidth 2318 that is symmetrical to the SBS bandwidth 2310, that is, bandwidth 2318 includes the same wavelengths as SBS bandwidth 2310 (after de-mixing). For simplicity, bandwidth 2318 is referred to as upper sideband SBS bandwidth 2318 although no SBS may happen at this frequency.

The modulation parameters comprise the three bias voltages 2122, which control the modulation of the modulation optical wave with the electrical RF signal. The computer 2130 sets the three bias voltages 2122 to generate the lower sideband 2302 to the modulation optical wave and the upper sideband 2304 to the modulation optical wave such that the lower sideband 2302 has less power than the upper sideband 2304, that is, the lower sideband amplitude 2306 is less than the upper sideband amplitude 2310 in FIG. 23. As mentioned above, in different examples, the upper sideband 2304 has less power than the lower sideband 2302 and SBS loss may be used.

As mentioned above, all bias voltages simultaneously impact the amplitudes and phases of the upper and lower sidebands and the optical carrier. However, the third bias voltage ($V_3 = \theta_3 V_\pi/\pi$) that controls the phase modulator in the DPMZ mainly determines the amplitude ratio between the sidebands.

The modulation parameters further comprise the temperature of the signal laser 2104, which defines the carrier frequency 2316.

The signal within the stop-band will be completely suppressed if the lower sideband amplitude 2306 amplified by the SBS gain 2308 is exactly the same as the upper sideband amplitude 2314, which means perfect amplitude equalisation. Adjusting the amplitude equalisation and anti-phase relation allows the adjustment of the suppression within the stop-band. Therefore, for a given SBS gain, the three modulator bias voltages are adjusted such that the desired suppression is achieved.

The computer 2130 then determines 2208 based on the difference modification parameters. The modification parameters comprise the input current of the pump laser 2102, the temperature of the pump laser 2102 and the control voltage of the attenuator 2106. The modification parameters control the equalisation of the power of light within the lower side band 2302 within the SBS bandwidth 2310 and light within the upper side band 2304 within the upper sideband SBS bandwidth 2318.

The modification parameters further control the production of an antiphase relationship between the light within the SBS bandwidth 2310 in the lower side band 2302 and the light within the upper side band SBS bandwidth 2318.

It is noted here that some control parameters, such as the input current of the signal laser 2104 may be considered as modulation parameter or modification parameter. Further, it is not necessary that all modulation parameters are determined before determining the modification parameters. Instead, the parameters may be determined in any order and one example of a particular order of determining the parameters is provided below.

Figure 24:
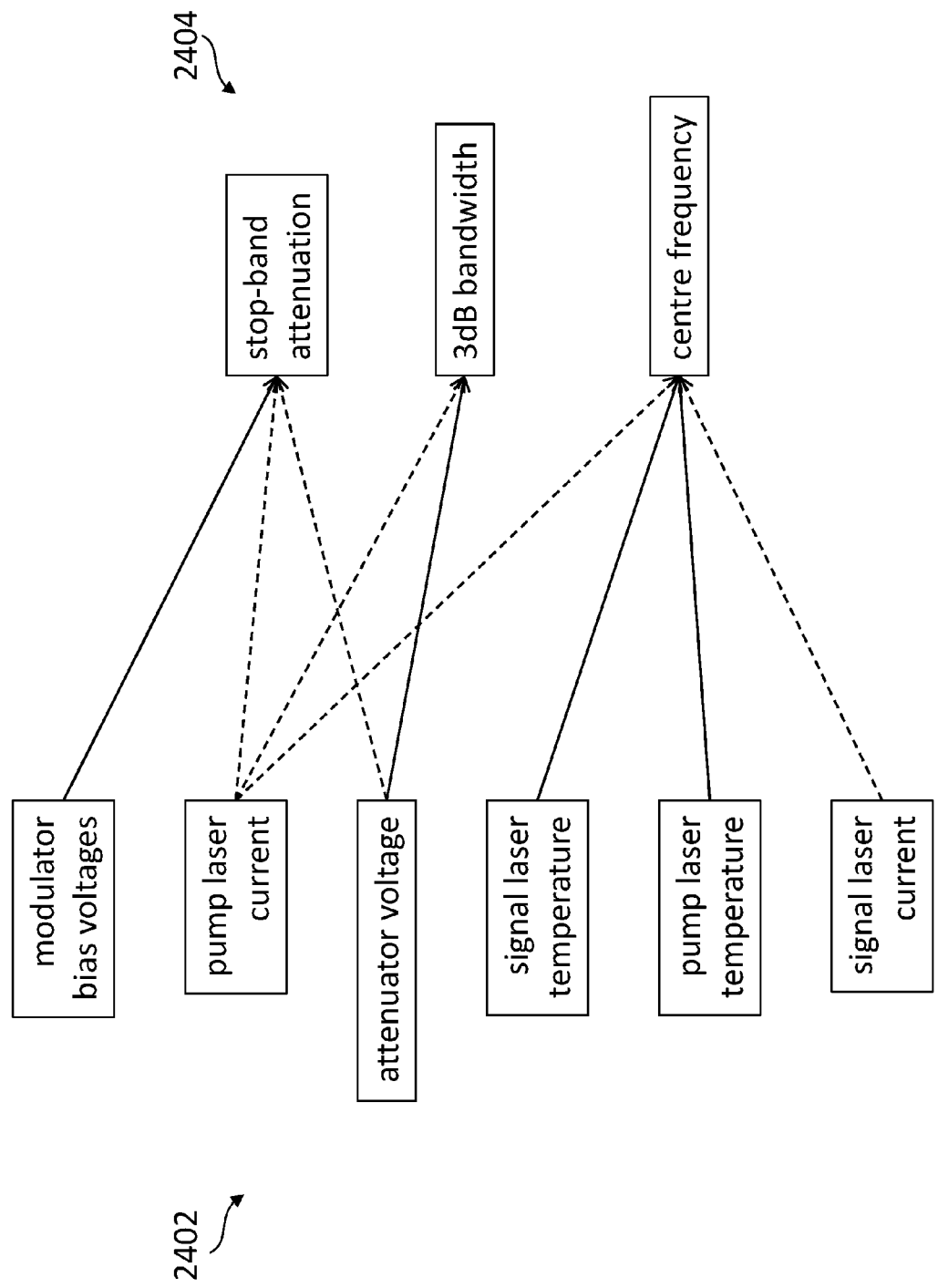
FIG. 24 illustrates the influence of the modulation and modification parameters on the filter characteristics.

FIG. 24 illustrates the influence of the modulation and modification parameters 2402 on the filter characteristics 2404. In one example, some influences are considered desired influences while others are considered parasitic influences. Desired influences are illustrated as solid lines, while parasitic influences are illustrates as dashed lines.

In one example, the computer 2130 sets the input current of the pump laser 2102 and the signal laser 2104 to a pre-defined maximum value and does not change these currents in order to control the filter characteristics. This is illustrated in FIG. 24 by only dashed lines originating from the pump laser current and the signal laser current.

Since the pump laser current influences the SBS gain in the spool 2112, this current also influences the stop-band attenuation. Further, as described above, changing the SBS gain also changes the 3 dB bandwidth and setting the laser current also changes the frequency of the laser and therefore influences the SBS gain centre frequency. For this reason the signal laser current also influences the centre stop-band centre frequency.

Once the laser currents are set, the computer 2130 determines the remaining parameters to achieve the desired filter characteristics.

The computer 2130 adjusts the temperatures of the pump laser 2102 and the signal laser 2104 to set the centre frequency. As can be seen in FIG. 23, the SBS centre frequency 2312 is an absolute value on the frequency axis and the carrier frequency 2316 is an absolute value on the frequency axis. However, after the optical signal is de-mixed by the photo detectors the resulting stop-band frequency is relative to carrier frequency 2316. As a result, the stop-band frequency is determined by the difference between the carrier frequency 2316 and the SBS centre frequency 2312, which are in turn defined by the signal laser temperature and pump laser temperature, respectively.

The next characteristic to control is the 3 dB bandwidth of the filter, which is influenced by the SBS gain, which in turn is controlled by the attenuator control voltage. Controlling the 3 dB bandwidth by the attenuator instead of the input current of signal laser has the advantage that changing the attenuator control voltage does not change the frequency of the pump light.

At last, computer 2130 adjusts the modulator bias voltages in order to achieve the desired stop-band attenuation or to achieve the maximum possible stop-band attenuation.

Using the desired influences illustrated by dashed lines in FIG. 24 has the advantage that the control process is separated into three isolated processes and each control process can be performed sequentially on a single parameter. For example, the computer 2130 can optimise the centre frequency by step-wise optimising the difference in laser temperatures, similar to linear optimisation. The computer 2130 can then proceed to optimise the attenuator control voltage and then the modulator bias voltages.

In one example, the computer 2130 has stored on a data store initial values for control parameters for each desired characteristic. For example, computer 2130 has stored initial pre-calculated temperatures of the signal laser 2104 and the pump laser 2102 for desired centre frequencies of 10 GHz and 12 GHz. If the desired centre frequency provided during operation is 11 GHz, the computer 2130 interpolates to determine initial values for the desired centre frequency. The computer 2130 can then use these initial values as starting point of the optimisation, which accelerates the process.

Similarly, the computer 2130 has stored initial values for the bias voltage of the optical attenuator 2106 for different values of the 3 dB bandwidth, such as 40 MHz. Further, the computer 2130 has stored initial values for the three bias voltages for the optical modulator 2114 for different values of the stop-band attenuation, such as 50 dB.

Any of the stored initial values may be further dependent on other parameters. For example, a look-up table for the three modulator voltages may have a first dimension for the stop-band attenuation and a second dimension for the 3 dB bandwidth because changing the stimulation input power by controlling the optical attenuator 2106 also influences the stop-band attenuation as shown by a dashed line in FIG. 24.

In one example, filter device 2100 is used to eliminate a dynamically changing jamming signal. In this case, the filter RF input is the payload signal from the antenna, such as an antenna in a fighter jet. A signal analyser used instead of the network analyser 2128 detects the frequency and bandwidth of the jamming signal and provides this information to the computer 2130. The computer receives these values as the desired filter characteristics and optimises the control parameters as described above.

This adjustment process is performed in real-time such that a dynamically changing jamming signal can be 'tracked' in the spectrum and efficiently eliminated. Machine learning algorithms may also be applied in order to predict the movement of the jamming signal in the spectrum to accelerate the adjustment to the control parameters.

Applications of the filter devices describe above may include:
- filtering jamming signals, in particular those with a jamming frequency that is variable over a wide spectrum; and
- reducing noise from a narrow-bandwidth noise source.

Variations and/or modifications may be made to the embodiments described without departing from the spirit or ambit of the invention. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method comprising the steps of:
generating an optical signal by modulating a modulation optical wave with an electrical signal to generate a first sideband to the modulation optical wave and a second sideband to the modulation optical wave, one of the first sideband and the second sideband having less power than the other;
modifying the optical signal by equalising the power of light within the first side band corresponding to a selected frequency band and light within the second side band corresponding to the selected frequency band, and producing an antiphase relationship between the light within the first side band corresponding to the selected frequency band and the light within the second side band corresponding to the selected frequency band; and
detecting the modified optical signal with an optical-to-electrical converter to generate a copy of the electrical signal with suppressed frequency components within the selected frequency band.

2. The method defined by claim 1 wherein the step of generating the optical signal comprises modulating the modulation optical wave with a Mach-Zehnder modulator system and the Mach-Zehnder modulator system comprises a plurality of component modulators in communication with an optical output of the Mach-Zehnder modulator system and the method comprises independently biasing the plurality of component modulators.

3. The method defined by claim 2 comprising splitting the electrical signal into a plurality of split electrical signals and driving each of the plurality of component modulators with a respective one of the plurality of split electrical signals, wherein one of the plurality of split electrical signals is out of phase with another one the plurality of split electrical signals.

4. The method defined by claim 1 wherein the step of modifying the optical signal comprises the step of applying an optical resonance to the optical signal to: equalise the power of the light in the first side band corresponding to the selected frequency band and the power of the light in the second side band corresponding to the selected frequency band; and produce the antiphase relationship.

5. The method defined by claim 4 wherein the optical resonance comprises a stimulated nonlinear optical resonance that one of increases and decreases the power of one of the light within the first side band corresponding to the selected frequency band and the light within the second side band corresponding to the selected frequency band.

6. The method defined by claim 5 wherein the step of applying the stimulated nonlinear optical resonance to the optical signal comprises tuning a magnitude of a gain of the stimulated nonlinear optical resonance such that the equalisation is achieved within the frequency band.

7. The method defined by claim 5 wherein the stimulated nonlinear optical resonance is one of stimulated Brillouin scattering and stimulated Raman scattering.

8. The method defined by claim 5 comprising the step of changing the average frequency of a stimulating optical wave of the stimulated nonlinear optical resonance such that the stimulated nonlinear optical resonance so modifies the optical signal.

9. The method defined by claim 8 wherein changing the average frequency of the stimulating optical wave comprises changing a frequency of electricity driving an optical modulator used to generate the stimulating optical wave.

10. The method defined by claim 8 comprising filtering the output of the optical modulator used to generate the stimulating optical wave to supress optical frequencies other than those of the stimulating optical wave.

11. The method defined by claim 8 further comprising:
generating the modulation optical wave using a first light source; and
generating the stimulation optical wave using a second light source.

12. The method defined by claim 11 wherein changing the average frequency of the stimulating optical wave comprises changing the average output frequency of the second light source.

13. The method defined by claim 11 comprising adjustably attenuating an output of the second light source to generate the stimulating optical wave.

14. The method defined by claim 4 wherein the optical resonance is an atomic optical resonance.

15. The method defined by claim 4 wherein the optical resonance is a linear optical resonance.

16. The method defined by claim 15 wherein applying the linear optical resonance comprises passing the optical signal through one of a ring resonator, a Fabry-Perot resonator, a Bragg grating, and a photonic crystal.

17. A device comprising:
an optical signal generator arranged to modulate a modulation optical wave when received by the optical signal generator with an electrical signal to generate a first sideband to the modulation optical wave and a second sideband to the modulation optical wave, one of the first sideband and the second sideband having less power than the other;
an optical signal modifier arranged to modify the optical signal by equalising the power of light within the first side band corresponding to a selected frequency band and light within the second side band corresponding to the selected frequency band, and produce an antiphase relationship between the light within the first side band corresponding the selected frequency band and the light within the second side band corresponding to the selected frequency band; and
an optical-to-electrical-converter arranged to receive the modified optical signal to generate a copy of the electrical signal with suppressed frequency components within the selected frequency band.

18. The device defined by claim 17 wherein the stimulated nonlinear optical resonance system comprises a tuneable stimulating optical wave generator arranged to generate a stimulating optical wave of tuneable frequency and a third order nonlinear optical medium arranged to receive the optical signal and stimulating optical wave when so generated.

19. A computer-implemented method for controlling a filter device, the method comprising:
   receiving one or more measured output characteristics of the filter;
   determining a difference between the one or more measured output characteristics and one or more desired output characteristics; and
   determining based on the difference
      one or more modulation parameters controlling a modulation of an modulation optical wave with an electrical signal to generate a first sideband to the modulation optical wave and a second sideband to the modulation optical wave, one of the first sideband and the second sideband having less power than the other, and
      one or more modification parameters controlling an equalisation of the power of light within the first side band corresponding to a selected frequency band and light within the second side band corresponding to the selected frequency band, and controlling the production of an antiphase relationship between the light within the first side band corresponding to the selected frequency band and the light within the second side band corresponding to the selected frequency band.

20. The method of claim 19, wherein the modulation parameters comprise one or more of:
   three bias voltages to control the power of the first sideband and the second sideband;
   a first temperature of a first laser generating the modulation optical wave to control the selected frequency band; and
   a first input current of a first laser generating the modulation optical wave to control an attenuation within the selected frequency band.

21. The method of claim 19, wherein the modification parameters comprise one or more of:
   a fourth bias voltage of an optical attenuator to control a bandwidth of the selected frequency band;
   a second temperature of a second laser generating a stimulating optical wave to control the selected frequency band; and
   a second input current of a second laser generating a stimulating optical wave to control an attenuation within the selected frequency band.

22. The method of claim 19, wherein the output characteristics comprise a centre frequency of the selected frequency band, a bandwidth of the selected frequency band and an attenuation within the selected frequency band and determining the one or more modulation parameters and the one or more modification parameters comprises:
   determining a first frequency control parameter of a first laser generating the modulation optical wave and a second frequency control parameter of a second laser generating a stimulating optical wave to adjust the measured centre frequency towards the desired centre frequency;
   determining an attenuation control parameter of an optical attenuator to adjust the measured bandwidth towards the adjusted bandwidth; and
   determining one or more sideband power control parameters to adjust the measured attenuation towards the desired attenuation.

23. The method of claim 22 wherein the determining steps are performed in the order of:
   (1) determining the first frequency control parameter and the second frequency control parameter;
   (2) determining the attenuation control parameter; and
   (3) determining the one or more sideband power control parameters.

24. A non-transitory computer readable medium, including computer-executable instructions stored thereon, that when executed by a processor, causes the processor to perform the method of claim 19.

25. A computer system for controlling a filter device, the computer system comprising:
   an input port to receive one or more measured output characteristics of the filter; and
   a processor to determine a difference between the one or more measured output characteristics and one or more desired output characteristics and to determine based on the difference
      one or more modulation parameters controlling a modulation of an modulation optical wave with an electrical signal to generate a first sideband to the modulation optical wave and a second sideband to the modulation optical wave, one of the first sideband and the second sideband having less power than the other, and
      one or more modification parameters controlling an equalisation of the power of light within the first side band corresponding to a selected frequency band and light within the second side band corresponding to the selected frequency band, and controlling the production of an antiphase relationship between the light within the first side band corresponding to the selected frequency band and the light within the second side band corresponding to the selected frequency band.

\* \* \* \* \*

UNITED STATES PATENT AND TRADEMARK OFFICE
CERTIFICATE OF CORRECTION

PATENT NO. : 9,673,908 B2
APPLICATION NO. : 14/899951
DATED : June 6, 2017
INVENTOR(S) : Marpaung et al.

Page 1 of 1

It is certified that error appears in the above-identified patent and that said Letters Patent is hereby corrected as shown below:

In the Claims

In Column 18, Line 27, in Claim 10, delete "supress" and insert --suppress-- therefor Signed and Sealed this
Eighteenth Day of June, 2019

Andrei Iancu
*Director of the United States Patent and Trademark Office*